United States Patent
Chen et al.

(10) Patent No.: US 10,761,359 B2
(45) Date of Patent: Sep. 1, 2020

(54) TOUCH DISPLAY DEVICE

(71) Applicant: Innolux Corporation, Miao-Li County (TW)

(72) Inventors: Hung-Kun Chen, Miao-Li County (TW); Hsieh-Li Chou, Miao-Li County (TW); Li-Wei Sung, Miao-Li County (TW); Tung-Kai Liu, Miao-Li County (TW); Chia-Hao Tsai, Miao-Li County (TW); Chih-Hao Chang, Miao-Li County (TW); Bo-Feng Chen, Miao-Li County (TW); Yu-Chien Kao, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 16/018,090

(22) Filed: Jun. 26, 2018

(65) Prior Publication Data

US 2018/0307076 A1    Oct. 25, 2018

Related U.S. Application Data

(63) Continuation of application No. 15/168,255, filed on May 31, 2016, now Pat. No. 10,031,363.
(Continued)

(30) Foreign Application Priority Data

Nov. 24, 2015    (TW) .............................. 104138894 A

(51) Int. Cl.
*G02F 1/1343*    (2006.01)
*G02F 1/1333*    (2006.01)
(Continued)

(52) U.S. Cl.
CPC ........ *G02F 1/13338* (2013.01); *G02F 1/1368* (2013.01); *G02F 1/133345* (2013.01);
(Continued)

(58) Field of Classification Search
None
See application file for complete search history.

(56) References Cited

U.S. PATENT DOCUMENTS 9,218,080 B2 *    12/2015    Oh .................... G02F 1/13338
9,638,949 B1 *    5/2017    Kim .................. G02F 1/13338
(Continued)

FOREIGN PATENT DOCUMENTS

| CN | 1129993 | 8/1996 |
|---|---|---|
| CN | 102650916 | 8/2012 |
| CN | 103026326 | 4/2013 |

OTHER PUBLICATIONS

"Office Action of China Counterpart Application," dated Aug. 3, 2018, pp. 1-8.

*Primary Examiner* — James A Dudek
(74) *Attorney, Agent, or Firm* — JCIPRNET

(57) ABSTRACT

A touch display device including a first substrate, a second substrate, a display medium, and a pixel array structure is provided. The pixel array structure includes a scan line, a data line, an active device, pixel electrodes, a signal electrode layer and a signal transmission layer. The scan line intersects the data line. The active device is connected to the scan line and the data line. The pixel electrodes are arranged in an array. The signal electrode layer includes signal electrodes. The signal transmission layer includes a signal line disposed between two adjacent columns of the pixel electrodes and electrically connected to one of the signal electrodes. The data line includes at least a portion located outside of the signal line.

17 Claims, 19 Drawing Sheets

Related U.S. Application Data

(60) Provisional application No. 62/202,570, filed on Aug. 7, 2015, provisional application No. 62/193,787, filed on Jul. 17, 2015, provisional application No. 62/171,592, filed on Jun. 5, 2015.

(51) Int. Cl.
  *G06F 3/041* (2006.01)
  *G06F 3/044* (2006.01)
  *G02F 1/1368* (2006.01)
  *G02F 1/1362* (2006.01)

(52) U.S. Cl.
  CPC .. *G02F 1/134309* (2013.01); *G02F 1/136286* (2013.01); *G06F 3/044* (2013.01); *G06F 3/0412* (2013.01)

(56) References Cited

U.S. PATENT DOCUMENTS

| | | | |
|---|---|---|---|
| 9,645,673 B2* | 5/2017 | Matsumoto | G06F 3/0416 |
| 9,727,158 B2* | 8/2017 | Oh | G02F 1/13338 |
| 2006/0017710 A1* | 1/2006 | Lee | G02F 1/13338 |
| | | | 345/173 |
| 2007/0131936 A1* | 6/2007 | Kang | G02F 1/1354 |
| | | | 257/72 |
| 2009/0295692 A1* | 12/2009 | Lee | G02F 1/13338 |
| | | | 345/87 |
| 2010/0053529 A1* | 3/2010 | Kanaya | G02F 1/13394 |
| | | | 349/139 |
| 2010/0271327 A1* | 10/2010 | Shin | G02F 1/13338 |
| | | | 345/174 |
| 2010/0302227 A1* | 12/2010 | Sasaki | G02F 1/13338 |
| | | | 345/211 |
| 2011/0157039 A1* | 6/2011 | Shin | G02F 1/13338 |
| | | | 345/173 |
| 2011/0227850 A1* | 9/2011 | Oh | G02F 1/13338 |
| | | | 345/173 |
| 2011/0228188 A1* | 9/2011 | Kim | G02F 1/13338 |
| | | | 349/43 |
| 2016/0320650 A1* | 11/2016 | Ding | G02F 1/13338 |
| 2016/0357049 A1* | 12/2016 | Chen | G02F 1/13338 |
| 2017/0023835 A1* | 1/2017 | Oh | G02F 1/13338 |
| 2017/0220187 A1* | 8/2017 | Wei | H01L 27/124 |
| 2017/0235401 A1* | 8/2017 | Abe | G06F 3/0418 |
| | | | 345/174 |
| 2017/0235414 A1* | 8/2017 | Ding | G06F 3/047 |
| | | | 345/174 |
| 2017/0269437 A1* | 9/2017 | Chen | G06F 3/044 |

\* cited by examiner

TOUCH DISPLAY DEVICE

CROSS-REFERENCE TO RELATED APPLICATION

This application is a continuation application of and claims the priority benefit of U.S. application Ser. No. 15/168,255, filed on May 31, 2016, now allowed, which claims the priority benefits of U.S. provisional application Ser. No. 62/171,592, filed on Jun. 5, 2015, U.S. provisional application Ser. No. 62/193,787, filed on Jul. 17, 2015, U.S. provisional application Ser. No. 62/202,570, filed on Aug. 7, 2015, and Taiwan application serial no. 104138894, filed on Nov. 24, 2015. The entirety of each of the above-mentioned patent applications is hereby incorporated by reference herein and made a part of this specification.

BACKGROUND

Field of the Invention

The invention is directed to a touch display device and more particularly, to a touch display device having a built-in touch structure.

Description of Related Art

In recent years, as the rapid development of applications such as information technology, wireless mobile communication and information appliances have been rapidly developed, the input devices of various information products have changed from the conventional devices such as key boards or mice to touch display panels to achieve the demands on more convenient and easy operation and more compact and light in volume. A conventional touch display panel currently is manufactured by respectively fabricating the touch panel and the display panel, and then assembling the touch panel with the display panel. However, the touch display panel manufactured in this way has disadvantages of higher cost, heavier in weight and lower optical transmittance in display effect, which need to be overcome.

Accordingly, many built-in touch structure designs have been proposed to render compact the overall volume of the touch display panel. Nevertheless, how to integrate the touch structure in the display panel without causing mutual affection between the display function and the touch function is an issue to be considered for the built-in touch structure designs.

SUMMARY

The invention provides a touch display device having a built-in touch sensing structure to improve a sensing capability of the built-in touch sensing structure.

According to an embodiment of the invention, a touch display device including a first substrate, a display medium and a pixel array structure is provided. The display medium is located on the first substrate, and the pixel array structure is located between the first substrate and the display medium. The pixel array structure includes a scan line, an another scan line, a data line, an active device, an another active device, a pixel electrode and a signal line. The another scan line is parallel to the scan line. The data line intersects the scan line and the another scan line, and the data line includes a first portion. The first active device is connected with the scan line and the data line. The another active device is connected with the another scan line and the data line. The pixel electrode is electrically connected with the active device, wherein at least a portion of the pixel electrode is adjacent to and between the scan line and the another scan line. The signal line includes a second portion, wherein the first portion and the second portion are disposed between the active device and the another active device, and the first portion partially overlaps the second portion in a line-width direction.

According to an embodiment of the invention, a touch display device including a first substrate, a display medium and a pixel array structure is provided. The display medium is located on the first substrate. The pixel array structure is located between the first substrate and the display medium. The pixel array structure includes a data line and a signal transmission layer. The signal transmission layer includes a signal line and a compensation signal line, wherein a line length of the compensation signal line is less than a line length of the data line. A part of the data line partially overlaps the signal line in a line-width direction.

To sum up, the pixel array structure according to one of the embodiments of the invention employs the signal electrode layer as the electrode not only for providing a pixel driving electric field but also for touch sensing and thus, has a built-in touch sensing structure. According to the embodiments of the invention, at least a part of an orthogonal projection of the signal transmission layer configured for transmitting a signal to the signal electrode layer does not overlap an orthogonal projection of the data line, which conduces to reduce a loading of the signal transmission layer by the data line. Thereby, the design of the pixel array structure facilitates to reduce a signal to noise ratio during a touch sensing operation. Thus, the pixel array structure of the embodiments of the invention can be applied in a display panel and a touch display device to provide a good touch sensing function.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
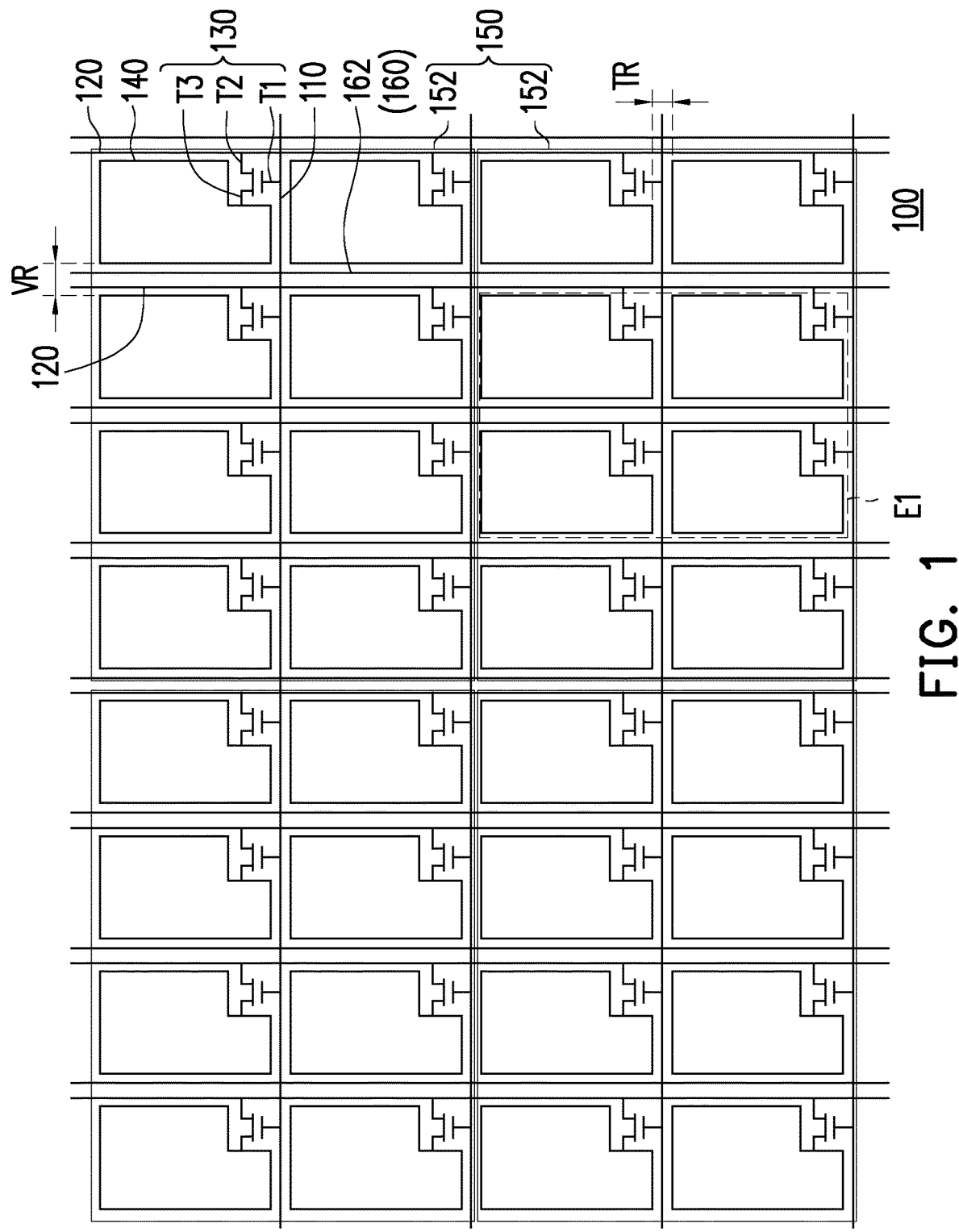
FIG. 1 is a schematic diagram illustrating a pixel array structure according to an embodiment of the invention.

FIG. 1 is a schematic diagram illustrating a pixel array structure according to an embodiment of the invention. Referring to FIG. 1, a pixel array structure 100 includes a plurality of scan lines 110, a plurality of data lines 120, a plurality of active devices 130, a plurality of pixel electrodes 140, a signal electrode layer 150 and a signal transmission layer 160. The data lines 120 intersect the scan lines 110. The active devices 130 are connected with the scan lines 110 and the data lines 120. The pixel electrodes 140 are connected with the active devices 130. The pixel electrodes 140 are arranged in an array, and a vertical wiring area VR is located between the pixel electrodes 140 of each two adjacent columns. The signal electrode layer 150 and the pixel electrodes 140 are stacked in the thickness direction, and the signal electrode layer 150 includes a plurality of signal electrodes 152 which are separated from one another. The signal transmission layer 160 includes a plurality of signal lines 162, and each of the signal lines 162 is electrically connected with one of the signal electrodes 152. The data lines 120 and the signal lines 162 are disposed in the vertical wiring area VR. In the present embodiment, the active devices 130 each is a three-terminal device, wherein a first terminal T1 is connected to one of the scan lines 110, a second terminal T2 is connected to one of the data lines 120, and the third terminal T3 is connected to one of the pixel electrodes 140. For instance, the active devices 130 may be thin film transistors, wherein the scan lines 110 may be configured to control turning on and turning off of the active devices 130, the data lines 120 may be configured to transmit signals required for displaying an image, and the signals on the data lines 120 may be input to the corresponding pixel electrodes 140 when the active devices 130 are turned on.

In FIG. 1, the signal electrodes 152 and the pixel electrodes 140 are mutually overlapped and are configured to provide a pixel driving electric field, and the signal electrodes 152 also serve as electrodes for touch sensing. Generally, the electrodes for touch sensing require a resolution that is sufficient for identifying a size of an area contacted by a user's finger or a stylus tip rather than a resolution as high as required by the pixel electrodes 140 for displaying images. Thus, an area of each of the signal electrodes 152 may be greater than an area of each of the pixel electrodes 140. In the present embodiment, the area of a single signal electrode 152 covering an area of 4×2 pixel electrodes 140 is exemplarily illustrated for example. However, in actual applications, the number of the pixel electrodes 140 covered by the area of a single signal electrode 152 may be determined according to the resolution of products.

Additionally, the pixel electrodes 140 are arranged in a plurality of columns and a plurality of rows. The pixel electrodes 140 of two adjacent rows define a horizontal wiring area TR, and a scan line 110 is disposed in one horizontal wiring area TR. The pixel electrodes 140 of two adjacent columns define a vertical wiring area VR, and a data line 120 and a signal line 162 are simultaneously disposed in one vertical wiring area VR. In this case, it may be difficult to avoid mutual coupling phenomena between the data line 120 and the signal line 162 in the same vertical wiring area VR, which results in increase in a loading of the signal transmission layer 160. It is preferable that the smaller the loading (e.g., RC-loading) of the signal transmission layer 160 the better the touch sensing performance, owing that the enhanced coupling phenomena between the data line 120 and the signal line 162 would influence on the touch sensing performance (e.g., a poor signal to noise ratio). Thus, the pixel array structure 100 may be implemented in various ways set forth in the embodiments below to reduce the loading of the signal transmission layer 160 and increase the touch sensing performance.

Figure 2:
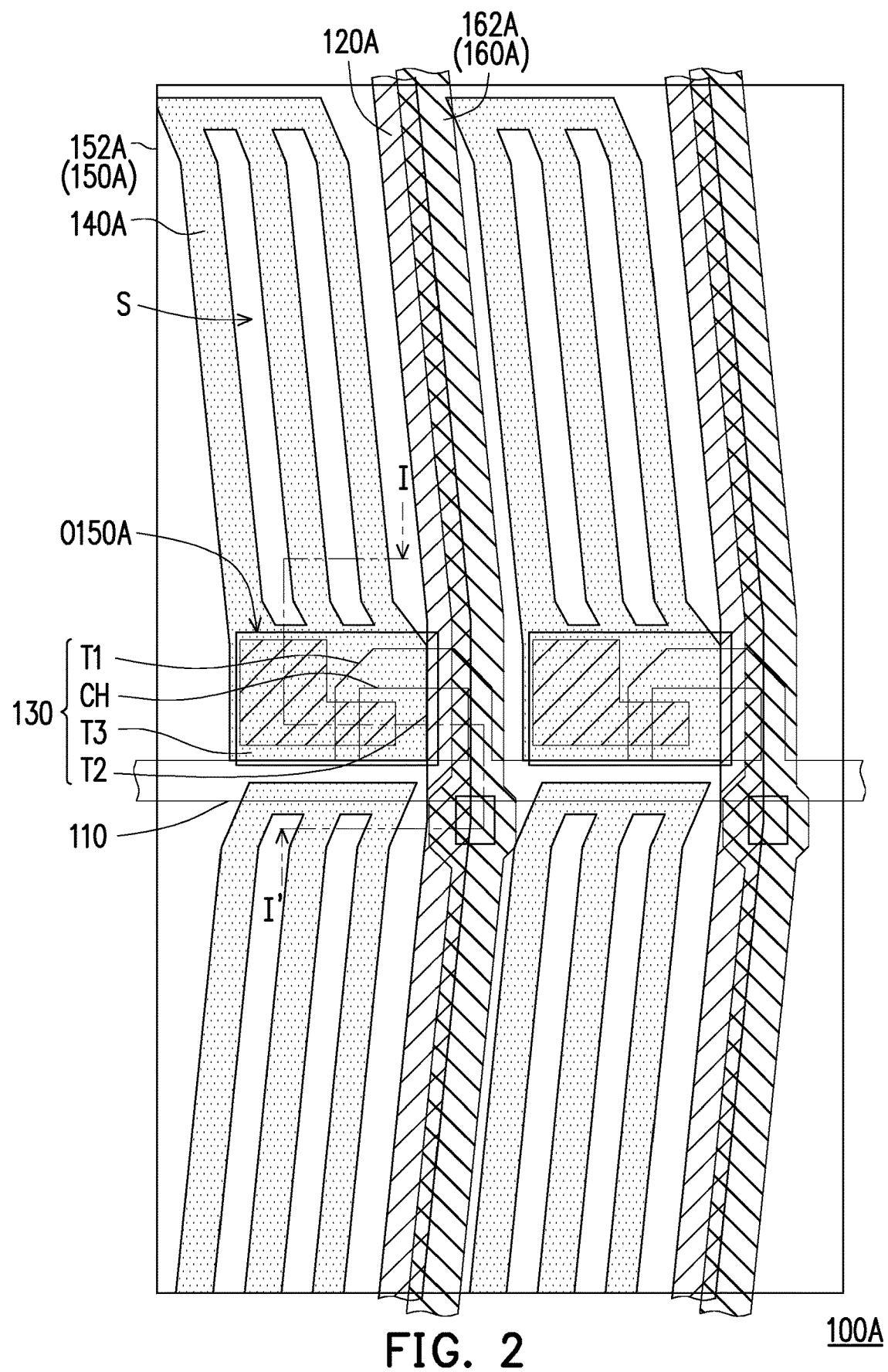
FIG. 2 is a schematic top-view diagram illustrating a pixel array structure according to another embodiment of the invention.
Figure 3:
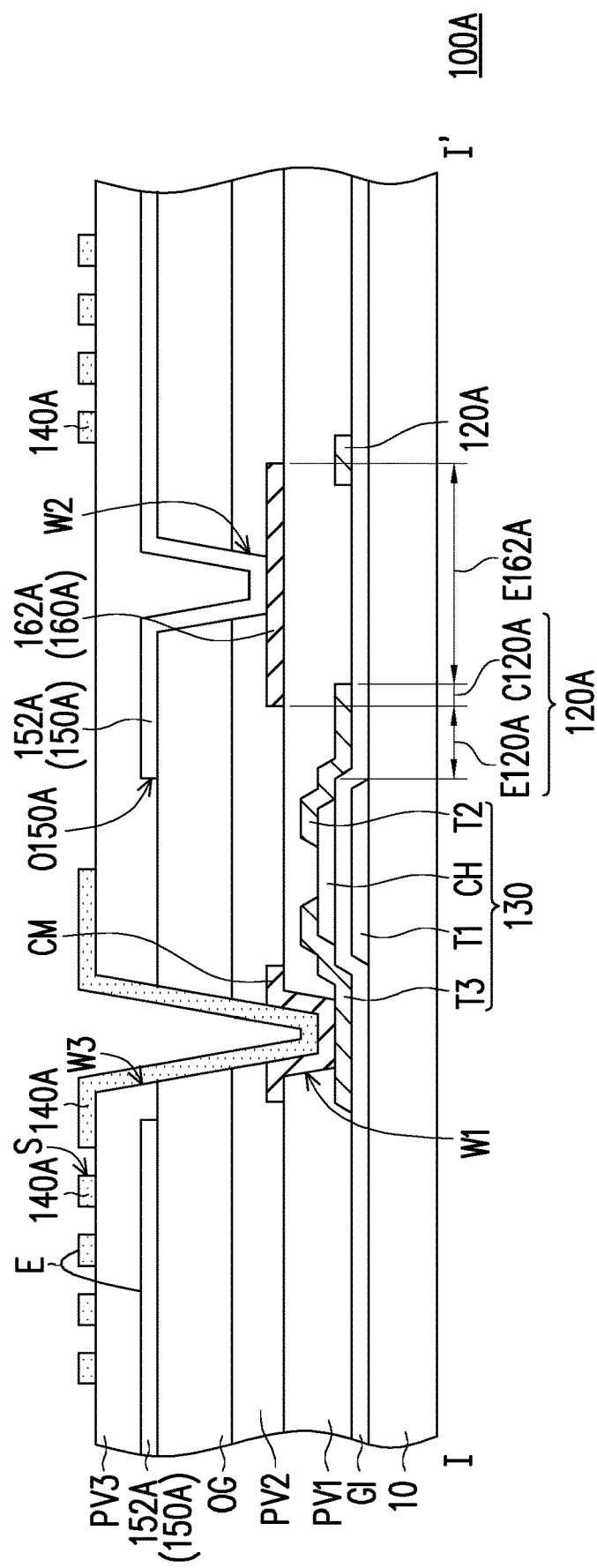
FIG. 3 is a schematic cross-sectional diagram illustrating the pixel array structure depicted in FIG. 2 along a line I-I'.

FIG. 2 is a schematic top-view diagram illustrating a pixel array structure according to another embodiment of the invention. FIG. 3 is a schematic cross-sectional diagram illustrating the pixel array structure depicted in FIG. 2 along a line I-I'. Referring to FIG. 2, a pixel array structure 100A in FIG. 2 is corresponding to a part E1 of the pixel array structure 100 illustrated in FIG. 1, and symbols of a part of the elements illustrated in FIG. 2 use the symbols of the corresponding elements labeled in FIG. 1. Thus, the configuration relationship of the elements illustrated in FIG. 2 may refer to FIG. 1. To be specific, the pixel array structure 100A includes scan lines 110, data lines 120A, active device 130, a pixel electrode 140A, a signal electrode layer 150A and a signal transmission layer 160A. In the present embodiment, the connection relationship of the pixel electrode 140A and other elements is similar to that of the pixel electrodes 140 illustrated in FIG. 1; however, in the present embodiment, the pixel electrode 140A has a plurality of slits S. The connection relationship of the signal electrode layer 150A and other elements is similar to that of the signal electrode layer 150 illustrated in FIG. 1; however, in the present embodiment, the signal electrode layer 150A has an opening O150A to expose the active device 130. Meanwhile, the connection relationship of the signal lines 162A of the signal transmission layer 160A and other elements is similar to that of the signal lines 162 of the signal transmission layer 160 illustrated in FIG. 1, and the connection relationship of the data lines 120A and other elements is similar to that of the data lines 120 illustrated in FIG. 1. In the present embodiment, the signal lines 162A and the data lines 120A partially overlap with each other, and partially not.

In the present embodiment, in terms of orthogonal projections perpendicular to the substrate 10 (please refer to FIG. 3), the data line 120A has a first orthogonal projection C120A and a second orthogonal projection E120A. The first orthogonal projection C120A overlaps an orthogonal projection of the signal line 162A located in the same vertical wiring area VR, and the second orthogonal projection E120A is outside the orthogonal projection of the signal line 162A. Furthermore, the signal line 162A has a third orthogonal projection E162A. The third orthogonal projection E162A is located outside an orthogonal projection of a corresponding data line 120A located in the same vertical wiring area VR, and in a line-width direction, the first orthogonal projection C120A is located between the second orthogonal projection E120A and the third orthogonal projection E162A. In the present embodiment, the first orthogonal projection C120A is less than 50% of an overall area of the data line 120A. In this way, only a part of the signal line 162A overlaps the data line 120A, so as to mitigate the coupling phenomena between the data line 120A and the signal line 162A.

Referring to both FIG. 2 and FIG. 3, the pixel array structure 100A is substantially formed by a plurality of film layers stacking on the substrate 10. The first terminal T1 of the active device 130 connected to one of the scan line 110 is formed by a first conductive layer on the substrate 10. Therein, though the scan line 110 is not labeled in FIG. 3, the first terminal T1 is substantially a part of the scan line 110. An insulation layer GI covers the first terminal T1 and the scan line 110 formed by the first conductive layer. A channel layer CH is disposed on the insulation layer GI, serves as a channel of the active device 130 and is made of a semiconductor material. The second terminal T2, the third terminal T3 and the data line 120A are all disposed on the insulation layer GI and the second terminal T2, the third terminal T3 and the data line 120A are formed by a second conductive layer. Therein, the second terminal T2 and the third terminal T3 are disposed on the channel layer CH and separated from each other. The first terminal T1, the second terminal T2, the third terminal T3 and the channel layer CH jointly form the active device 130.

An insulation layer PV1 covering the data line 120A, the second terminal T2, the third terminal T3 and the channel layer CH, and the signal transmission layer 160A is disposed on the insulation layer PV1. The signal transmission layer 160A is formed by a third conductive layer. The third conductive layer may further selectively include a conductive structure CM, and the insulation layer PV1 has a contact window W1, such that the conductive structure CM is connected with the third terminal T3 of the active device 130 through the contact window W1. An insulation layer PV2 covering the signal transmission layer 160A, and a planarization layer OG is disposed on the insulation layer PV2. The signal electrode layer 150A is disposed on the planarization layer OG. A contact window W2 penetrates the planarization layer OG and the insulation layer PV2, such that the signal electrode 152A of the signal electrode layer 150A is electrically connected with the signal line 162A through the contact window W2. An insulation layer PV3 covers a signal electrode 152A of the signal electrode layer 150A. The pixel electrode 140A is disposed on the insulation layer PV3, and the pixel electrode 140A is connected with the conductive structure CM through the contact window W3, so as to electrically connect with the third terminal T3 of the active device 130 through the conductive structure CM. Therein, the contact window W3 penetrates the insulation layer PV3, the planarization layer OG and the insulation layer PV2. Additionally, the signal electrode layer 150A has an opening O150A to expose the active device 130, and the contact window W3 is located within an area of the opening O150A. In the present embodiment, the signal transmission layer 160A is located under the planarization layer OG, and a distance between the signal transmission layer 160A and the signal electrode layer 150A may be increased by increasing a thickness of the planarization layer OG, so as to mitigate a coupling effect between the signal transmission layer 160A and the signal electrode layer 150A.

In an embodiment, the signal line 162A of the signal transmission layer 160A may have an extended length to overlap more than one signal electrode 152A while is electrically connected with only one of the overlapped signal electrodes 152A. Thus, with the planarization layer OG, the increase of the distance between the signal transmission layer 160A and the signal electrode layer 150A contributes to the mitigation of the coupling phenomena between the signal line 162A of the signal transmission layer 160A and the other overlapped signal electrodes 152A that are not directly electrically connected with the signal line 162A of the signal transmission layer 160A.

In the present embodiment, the first conductive layer, the second conductive layer and the third conductive layer may be made of metal, metal alloy, a conductive oxide, an organic conductive material or a combination of the aforementioned materials. Alternatively, at least one of the first conductive layer, the second conductive layer and the third conductive layer can be a stacking layer formed by multiple conductive materials layers. The insulation layers PV1, PV2 and PV3 may be made of insulating oxide, nitride, or oxynitride, such as silicon oxide, silicon nitride, and nitrogen silicon oxide. The planarization layer OG may be made of an organic insulation material. The signal electrode 152A and the pixel electrode 140A may be made of a transparent conductive material or formed by light-transmissive conductive layers such as metal mesh layers, nano conductive wire layers, carbon nanotube layers or other conductive layers having sufficient light transmittance rate. However, the aforementioned materials are merely listed for example, but construe no limitations to the invention. Moreover, one of the insulation layer PV2 and the planarization layer OG may be omitted.

Referring to FIG. 3, the signal electrode 152A is located between the pixel electrode 140A and the substrate 10, and the pixel electrode 140A has a plurality of slits S. Orthogonal projections of the slits S overlap an orthogonal projection of the signal electrode 152A on the substrate 10. When the pixel array structure 100A is applied in an apparatus and displays an image, a common potential is input into the signal electrode 152A, and the pixel electrode 140A receives a signal transmitted from one of the data lines 120A, so as to generate a pixel driving electric field E by the fringe electrical field effect generated around the slits S. In this way, the pixel array structure 100A drives display medium in the display apparatus to achieve the display function. However, the pixel array structure 100A may also generate the pixel driving electric field E by utilizing other methods, without being limited to the aforementioned method. For instance, the pixel array structure 100A may be applied in a vertical electric field type display apparatus or an in-plane switch type display apparatus.

In addition, the film layer of the data lines 120A is located between the film layer of the signal transmission layer 160A and the film layer of the scan lines 110, and only one insulation layer PV1 is between the film layer of the data lines 120A (which is the second conductive layer) and the film layer of the signal transmission layer 160A (which is the third conductive layer), which may result in the coupling phenomena between the data lines 120A and the signal transmission layer 160A. Nevertheless, in the present embodiment, as illustrated in FIG. 2, only part of an orthogonal projection of the data line 120A overlaps the orthogonal projection of the signal line 162A, and only part of the orthogonal projection of the signal line 162A overlaps the orthogonal projection of the data line 120A. Thereby, the coupling phenomena between the data lines 120A and the signal transmission layer 160A may be mitigated. In other words, the loading to the signal transmission layer 160A by the coupling effect of the data lines 120A may be reduced, which contributes to increase the touch sensing performance.

In the present embodiment, only one signal electrode layer 150A is capable of achieving touch sensing, and thus, the pixel array structure 100A is a touch sensing structure of one layer solution (OLS). Each signal electrode 152A of the signal electrode layer 150A may perform touch sensing by utilizing a self-capacitance sensing mode, or each two of the signal electrodes 152A of the signal electrode layer 150A may be paired and perform touch sensing by utilizing a mutual-capacitance sensing mode. Additionally, the signal electrode layer 150A serves as the electrode layer not only for displaying but also for touch sensing, and thus, the present embodiment may achieve a built-in touch sensing structure without providing additional film layers.

Figure 4:
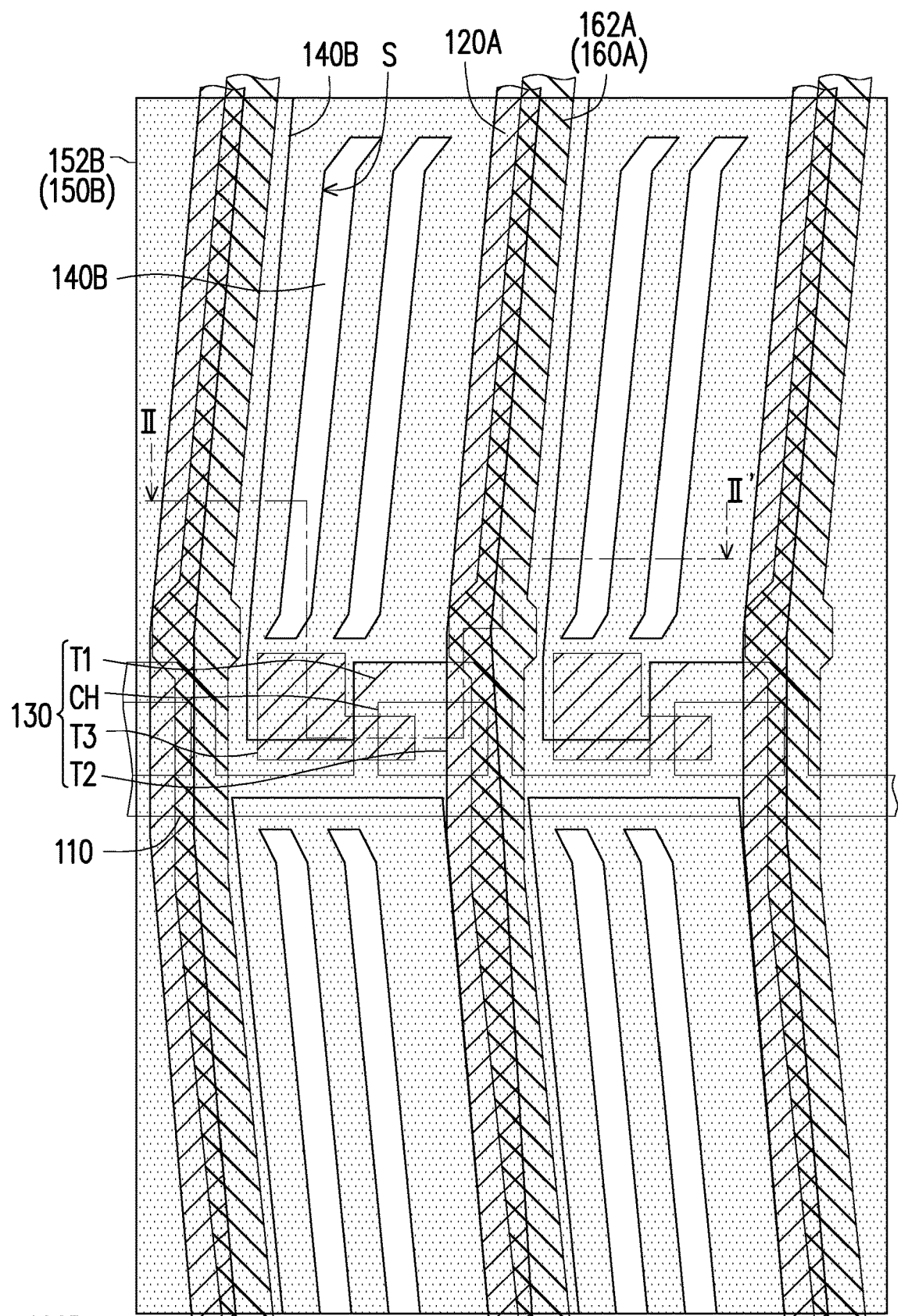
FIG. 4 is a schematic top-view diagram illustrating a pixel array structure according to yet another embodiment of the invention.
Figure 5:
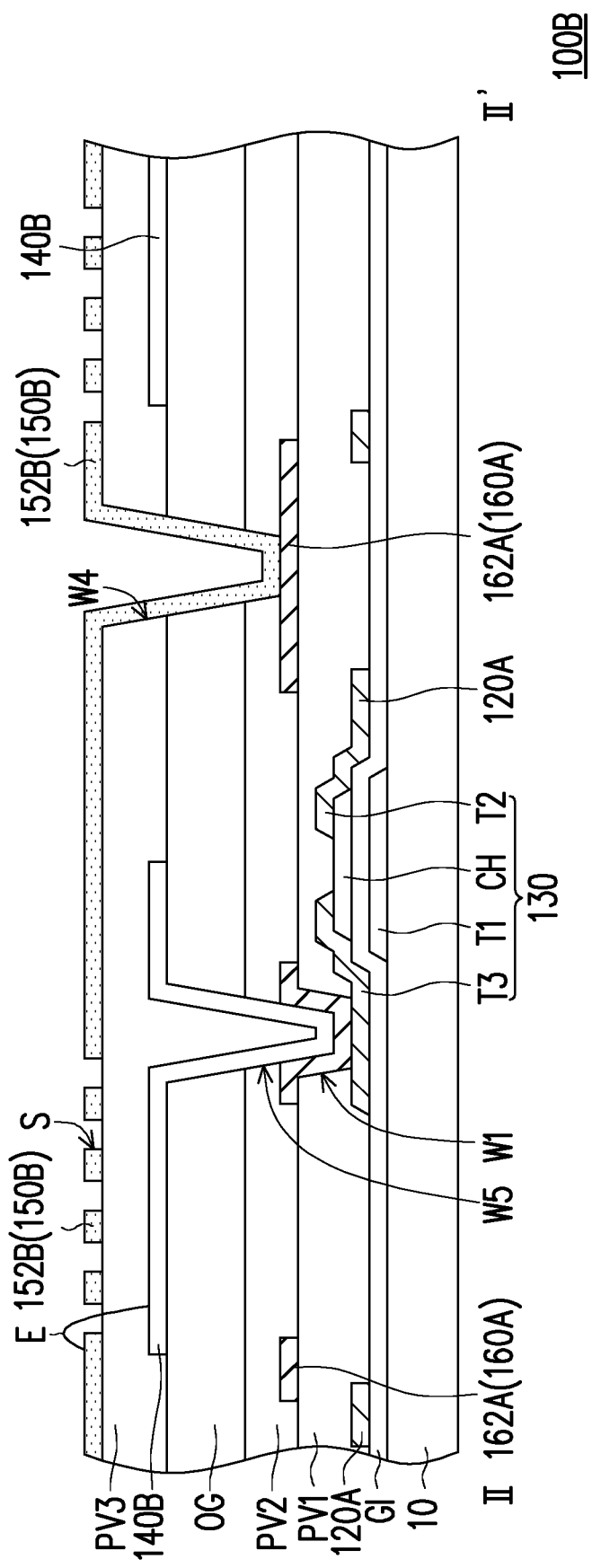
FIG. 5 is a schematic cross-sectional diagram illustrating the pixel array structure depicted in FIG. 4 along a line II-II'.

FIG. 4 is a schematic top-view diagram illustrating a pixel array structure according to yet another embodiment of the invention. FIG. 5 is a schematic cross-sectional diagram illustrating the pixel array structure depicted in FIG. 4 along a line II-II'. Referring to FIG. 4, a pixel array structure 100B of the present embodiment is similar to the pixel array structure 100A. The pixel array structure 100B includes scan lines 110, data lines 120A, active devices 130, pixel electrodes 140B, a signal electrode layer 150B and a signal transmission layer 160A. To be specific, descriptions related to the scan lines 110, the data lines 120A, the active devices 130 and the signal transmission layer 160A of the pixel array structure 100B may refer to those depicted in the above embodiments.

Referring to both FIG. 4 and FIG. 5, in the present embodiment, the pixel electrodes 140B and the signal electrode layer 150B are stacked in a sequence different from the embodiments illustrated in FIG. 2 and FIG. 3. To be specific, the pixel electrodes 140E are located between the signal electrode layer 150B and the substrate 10, and the signal electrode layer 150B has slits S, where orthogonal projections of the pixel electrodes 140B overlap the orthogonal projections of the slits S to provide the pixel driving electric field E by the pixel electrodes 140B and the signal electrode layer 150B.

Referring to FIG. 5, the signal electrode 152B of the signal electrode layer 150B is electrically connected with the signal line 162A of the signal transmission layer 160A through a contact window W4 penetrating the insulation layer PV3, the planarization layer OG and the insulation layer PV2. Additionally, the pixel electrodes 140B each is located between the planarization layer OG and the insulation layer PV3 and is electrically connect with the third terminal T3 of the active device 130 through the contact window W5 penetrating the planarization layer OG and the insulation layer PV2.

In the present embodiment, the signal electrodes 152B of the signal electrode layer 150B are capable of displaying the image and performing touch sensing, and thus, the present embodiment may achieve a built-in touch sensing structure without providing additional film layers. Moreover, even though the data line 120A and the signal line 162A of the signal transmission layer 160A are located in the same vertical wiring area (VR as shown in FIG. 1), the orthogonal projection of the data line 120A only partially overlaps the orthogonal projection of the corresponding signal line 162A, which contributes to mitigate the coupling effect between the data line 120A and the signal line 162A. Therefore, a loading of the signal transmission layer 160A may be reduced, which contributes to improving the touch sensing performance.

Figure 6A:
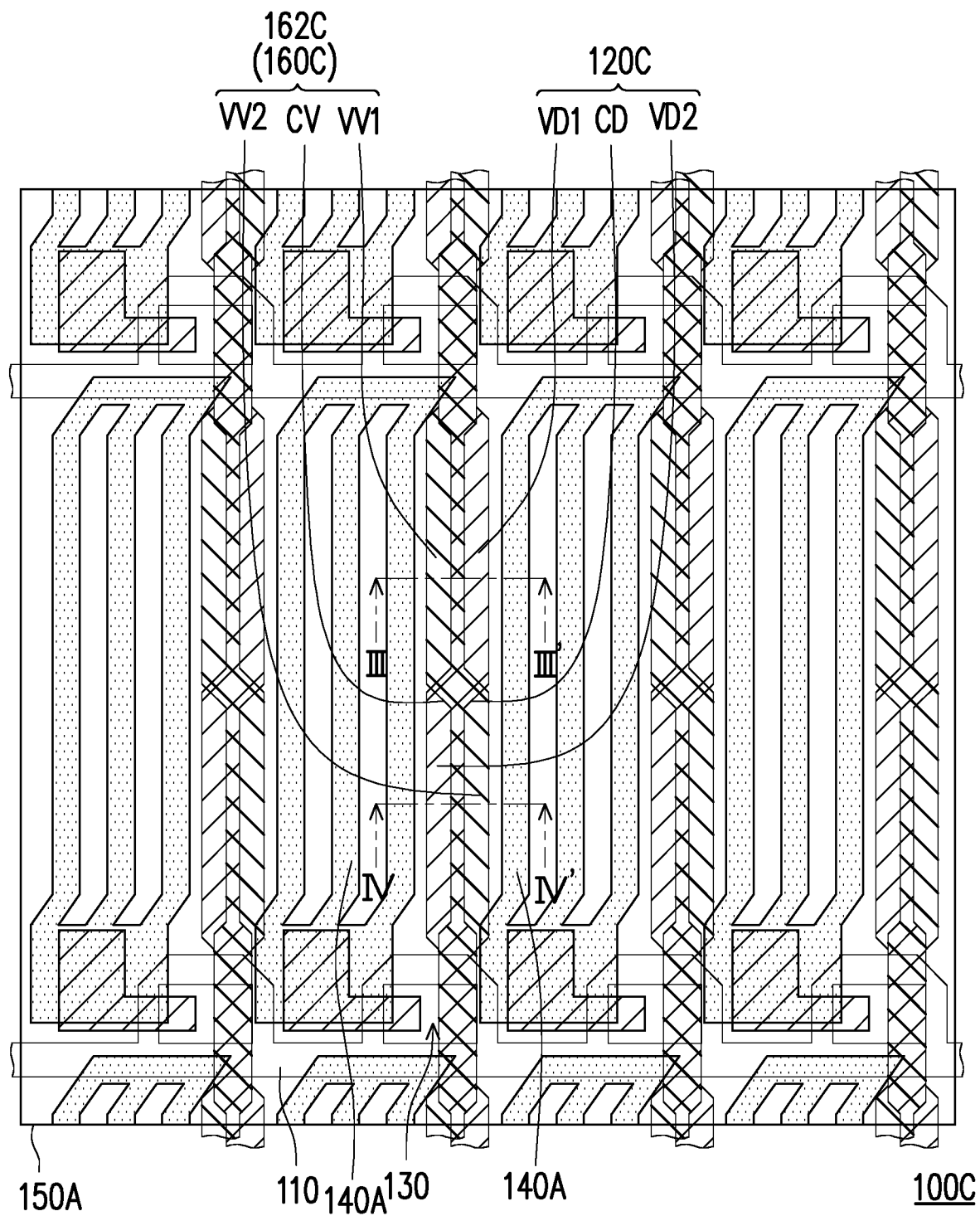
FIG. 6A is a schematic top-view diagram illustrating a pixel array structure according to still another embodiment of the invention.
Figure 6B:
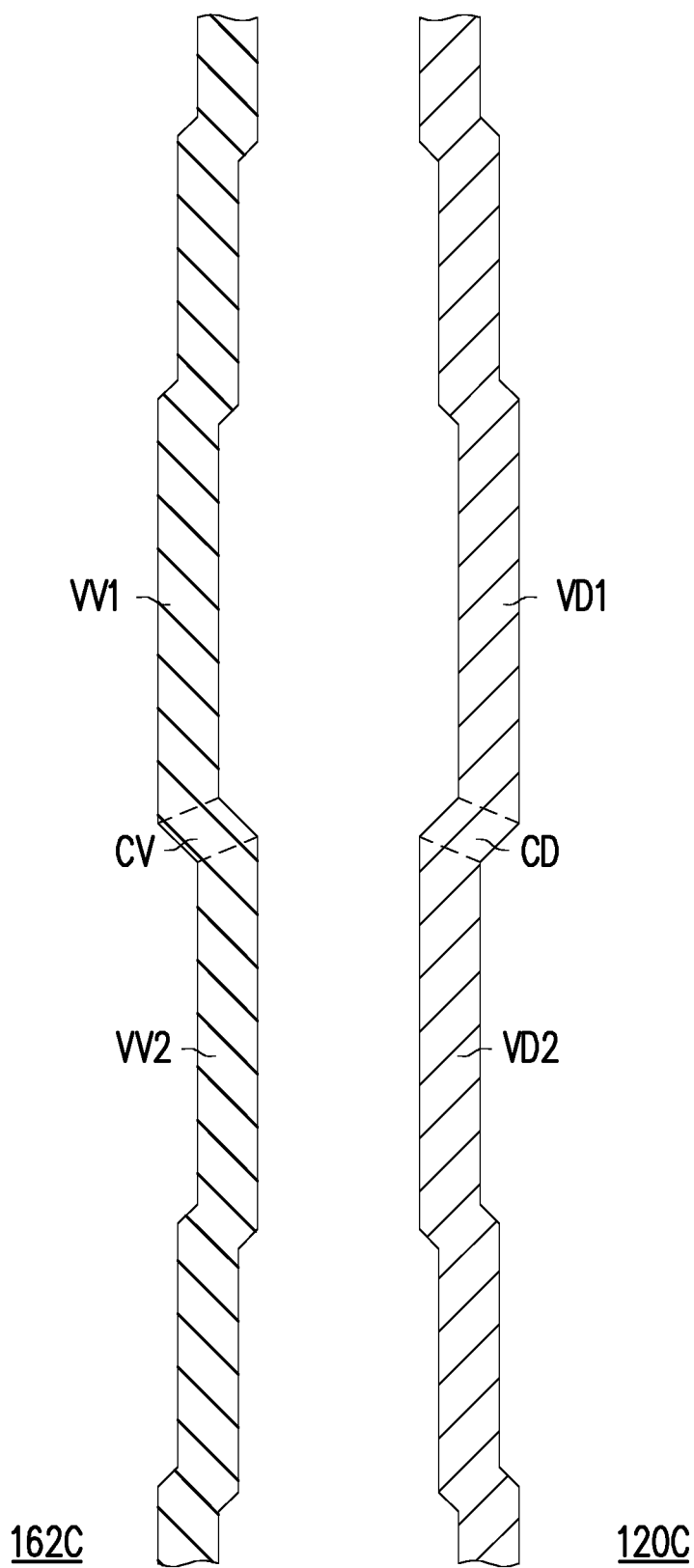
FIG. 6B is a schematic diagram illustrating the data lines and the signal lines of the pixel array structure depicted in FIG. 6A.
Figure 7:
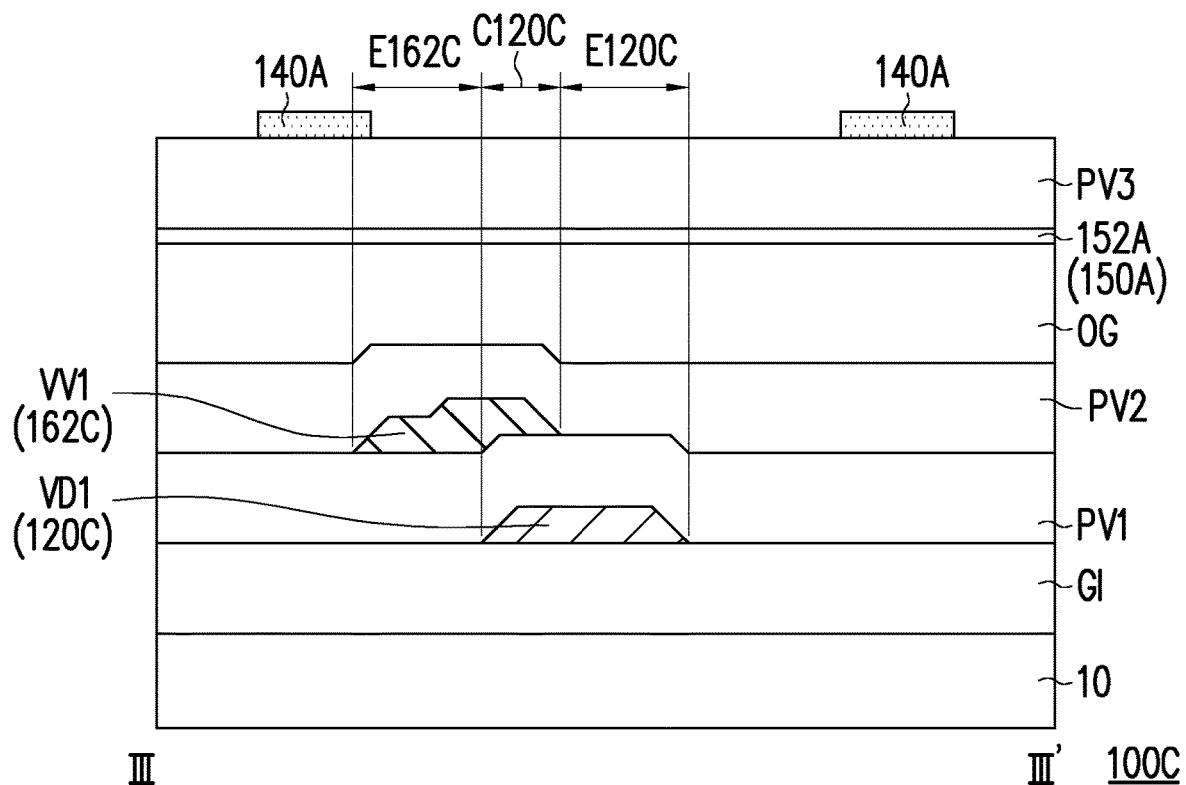
FIG. 7 is a schematic cross-sectional diagram illustrating the pixel array structure depicted in FIG. 6A along a line III-III'.
Figure 8:
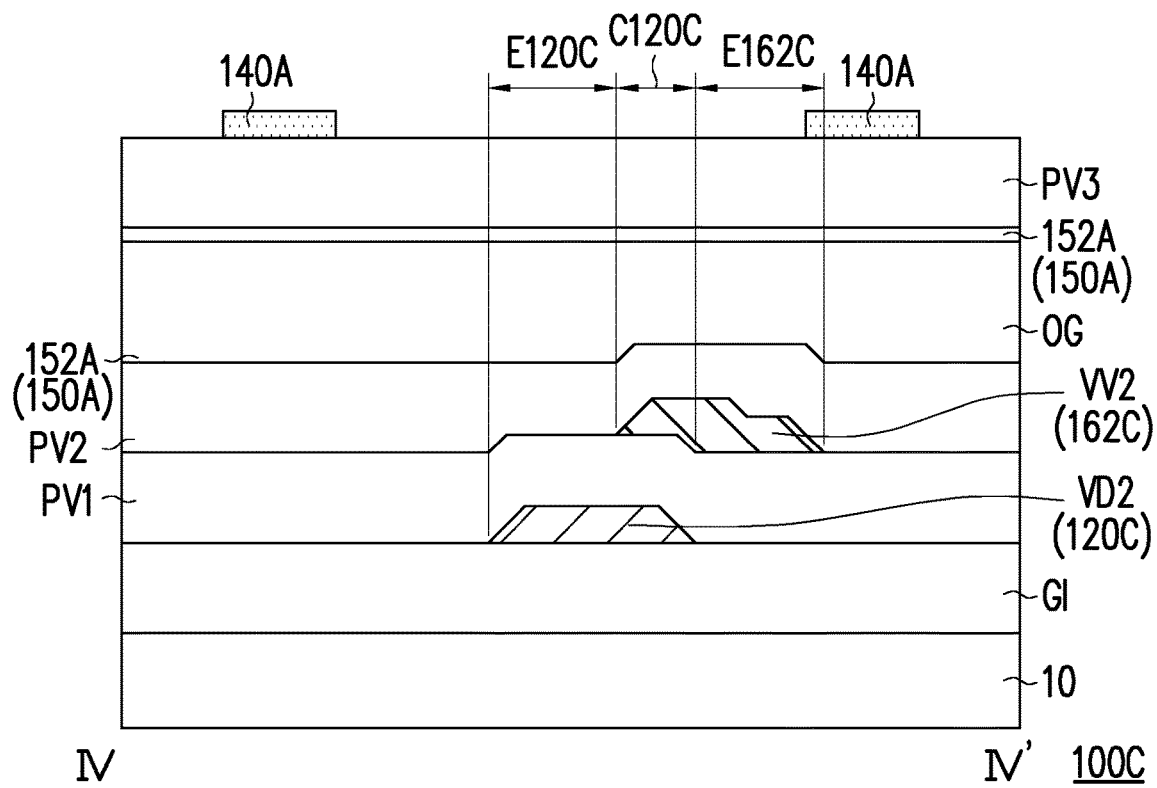
FIG. 8 is a schematic cross-sectional diagram illustrating the pixel array structure depicted in FIG. 6A pixel array structure along a line IV-IV'.

FIG. 6A is a schematic top-view diagram illustrating a pixel array structure according to still another embodiment of the invention. FIG. 6B is a schematic diagram illustrating the data lines and the signal lines of the pixel array structure depicted in FIG. 6A. FIG. 7 and FIG. 8 are schematic cross-sectional diagrams respectively illustrating the pixel array structure depicted in FIG. 6A along a line and a line IV-IV'. Referring to FIGS. 6A, 7 and 8, a pixel array structure 100C of the present embodiment is similar to the pixel array structure 100A. The pixel array structure 100C includes scan lines 110, data lines 120C, active devices 130, pixel electrodes 140A, a signal electrode layer 150A and a signal transmission layer 160C. To be specific, descriptions related to the scan lines 110, the active devices 130, the pixel electrodes 140A, the signal electrode layer 150A, the insulation layers GI, PV1 to PV3 and the planarization layer OG of the pixel array structure 100C may refer to those depicted in the above embodiments. In the present embodiment, the data lines 120C and the signal lines 162C of the signal transmission layer 160C are in a zigzag shape, respectively, and this may facilitate in reducing an overlapping ratio of orthogonal projections of two linear structures, so as to reduce a loading of the signal transmission layer 160C.

Referring to FIG. 6A and FIG. 6B, the data lines 120C include a plurality of first vertical portions VD1 and VD2 and a plurality of first turning portions CD. The first vertical portions VD1 and VD2 respectively extend along a vertical direction, and each first turning portion CD is connected between two of the first vertical portions VD1 and VD2. The signal lines 162C include a plurality of second vertical portions VV1 and VV2 and a plurality of second turning portions CV. The second vertical portions VV1 and VV2 respectively extend along a vertical direction, and each second turning portion CV is connected between two second vertical portions VV1 and VV2. The first turning portions CD and the second turning portions CV have different inclined directions, and the first turning portions CD intersect the second turning portions CV.

Furthermore, referring to FIG. 6B, the first vertical portion VD1 and the second vertical portion VV1 are parallel to each other, and the first vertical portion VD2 and the second vertical portion VV2 are parallel to each other. The first vertical portion VD1 is located on an extension line of the second vertical portion VV2, and the first vertical portion VD2 is located on an extension line of the second vertical portion VV1. Namely, the first vertical portion VD1 and the second vertical portion VV2 are distributed alternately along the same straight linear track, and the first vertical portion VD2 and the second vertical portion VV1 are distributed alternately along the same straight linear track. On the other hand, a part of an orthogonal projection of the first vertical portion VD1 overlaps an orthogonal projection of the second vertical portion VV1 in the line-width direction, while another part of the orthogonal projection of the first vertical portion VD1 is located outside the orthogonal projection of the second vertical portion VV1. In the same way, a part of an orthogonal projection of the first vertical portion VD2 overlaps an orthogonal projection of the second vertical portion VV2 in the line-width direction, while another part of the orthogonal projection of the first vertical portion VD2 is located outside the orthogonal projection of the second vertical portion VV2. In other words, referring to FIG. 7 and FIG. 8, the data line 120C has a first orthogonal projection C120C and a second orthogonal projection E120C. The first orthogonal projection C120C overlaps an orthogonal projection of the corresponding signal line 162C, and the second orthogonal projection E120C is located outside an orthogonal projection of the signal line 162C. Furthermore, the signal line 162C has a third orthogonal projection E162C. The third orthogonal projection E162C is located outside an orthogonal projection of the corresponding data line 120C, and the first orthogonal projection C120C is located between the second orthogonal projection E120C and the third orthogonal projection E162C. Meanwhile, according to the illustrations and directions labeled by the texts in FIG. 6A, FIG. 7 to FIG. 8, the second orthogonal projection E120C corresponding to the first vertical portion VD1 is located at the right side of the first orthogonal projection C120C, and the second orthogonal projection E120C corresponding to the first vertical portion VD2 is located at the left side of the first orthogonal projection C120C. A part of the orthogonal projection of the data line 120C overlaps a part of the orthogonal projection of the signal line 162C on the substrate 10, while another part of the orthogonal projection of the data line 120C does not, so as to mitigate the coupling phenomena with respect to the data line 120C to reduce the loading of the signal transmission layer 160C. For instance, the first orthogonal projection C120C, i.e., an overlapping area of the data line 120C and the signal line 162C may be less than 50% of an overall area of the data lines 120C.

In an embodiment, the data line 120C and the signal line 162C are manufactured in different patterning processes. Thus, the two different patterning processes which are respectively performed may have an alignment deviation, which causes relative positions of the data line 120C and the signal line 162C to be in incompliance with a preset condition. However, in the present embodiment, the data line 120C and the signal line 162C are respectively in the zigzag shape, and the turning structures have opposite turning directions. Thus, in case the occurrence of the alignment deviation causes the misalignment of the data line 120C and the signal line 162C, a ratio of the overlapping area of the data line 120C and the signal line 162C does not apparently change.

For instance, in the pixel array structure 100C illustrated in FIG. 6A, in case the alignment deviation causes the data line 120C to shift toward the right side in the drawing with respect to an originally preset position, an overlapping area of the first vertical portion VD1 and the second vertical portions VV1 is less than a preset value, but an overlapping area of the first vertical portion VD2 and the second vertical portion VV2 is more than the preset value. Thus, the areas of the first vertical portion VD1 and the first vertical portion VD2 overlapping the signal line 162C may be compensated for each other, without being affected by the misalignment occurring the manufacturing process. In other words, the data line 120C and the signal line 162C are designed in the zigzag shape, such that even though the misalignment occurs during the manufacturing process, the ratio of the overlapping area of the data line 120C and the signal line 162C may be maintained within the preset range, which contributes to improving a process window and obtaining consistency in quality of final products. Additionally, even the misalignment occurs, the overall area occupied by the data line 120C and the signal line 162C is not changed, and thus, an area of a light-transmitting region or an effective display region is not changed due to the change in the overall area of the data line 120C and the signal line 162C when the pixel array structure 100C is applied in the display apparatus.

Figure 9:
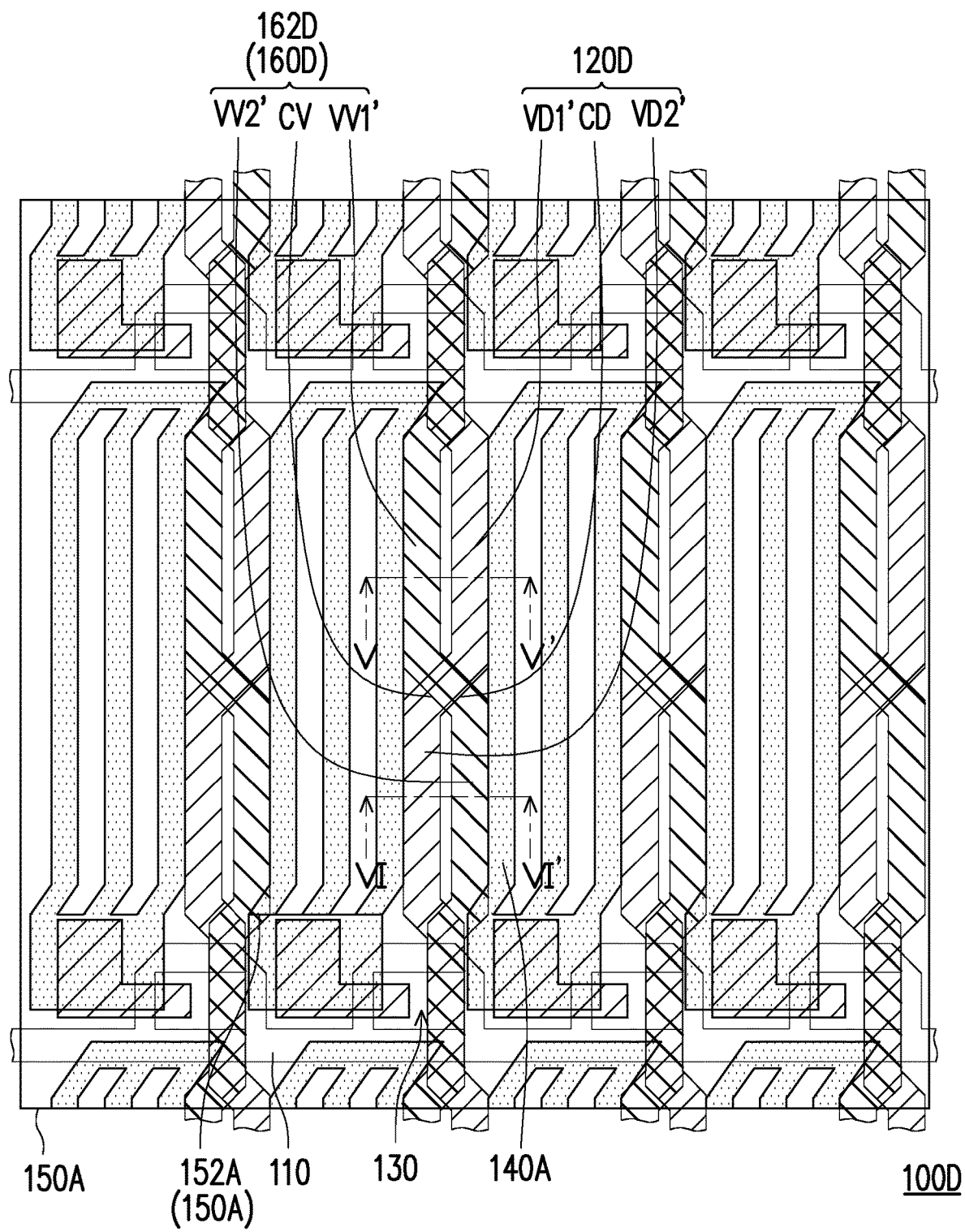
FIG. 9 is a schematic top-view diagram illustrating a pixel array structure according to still another embodiment of the invention.
Figure 10:
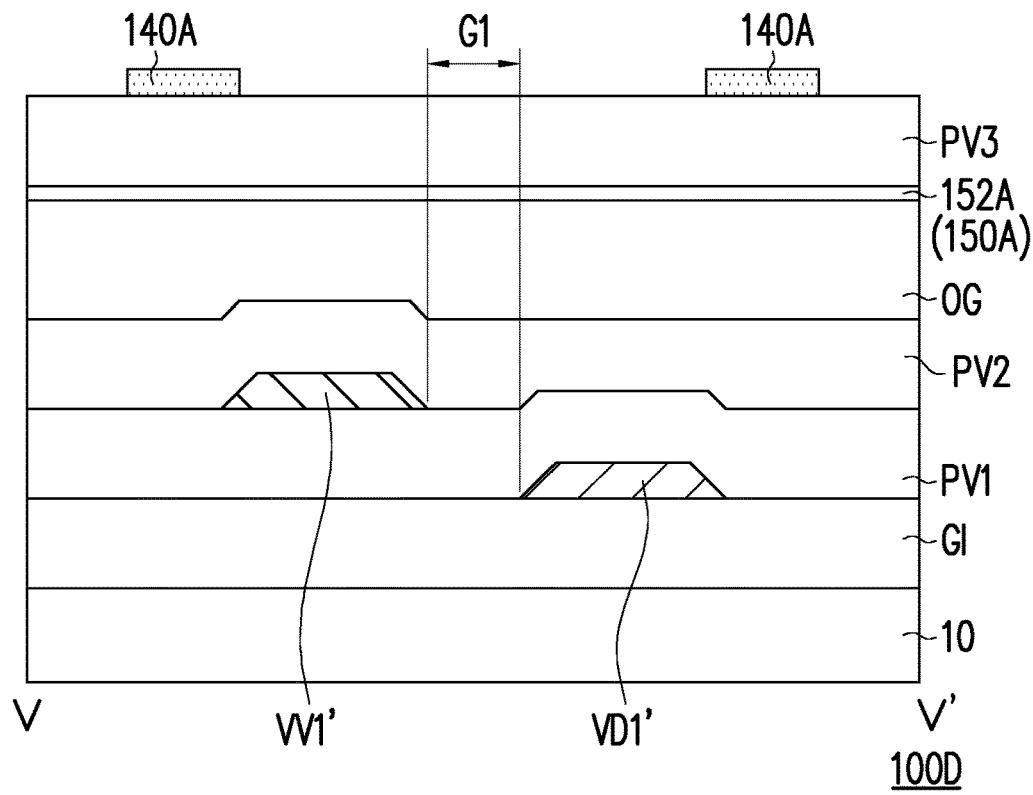
FIG. 10 is a schematic cross-sectional diagram illustrating the pixel array structure depicted in FIG. 9 along a line V-V'.
Figure 11:
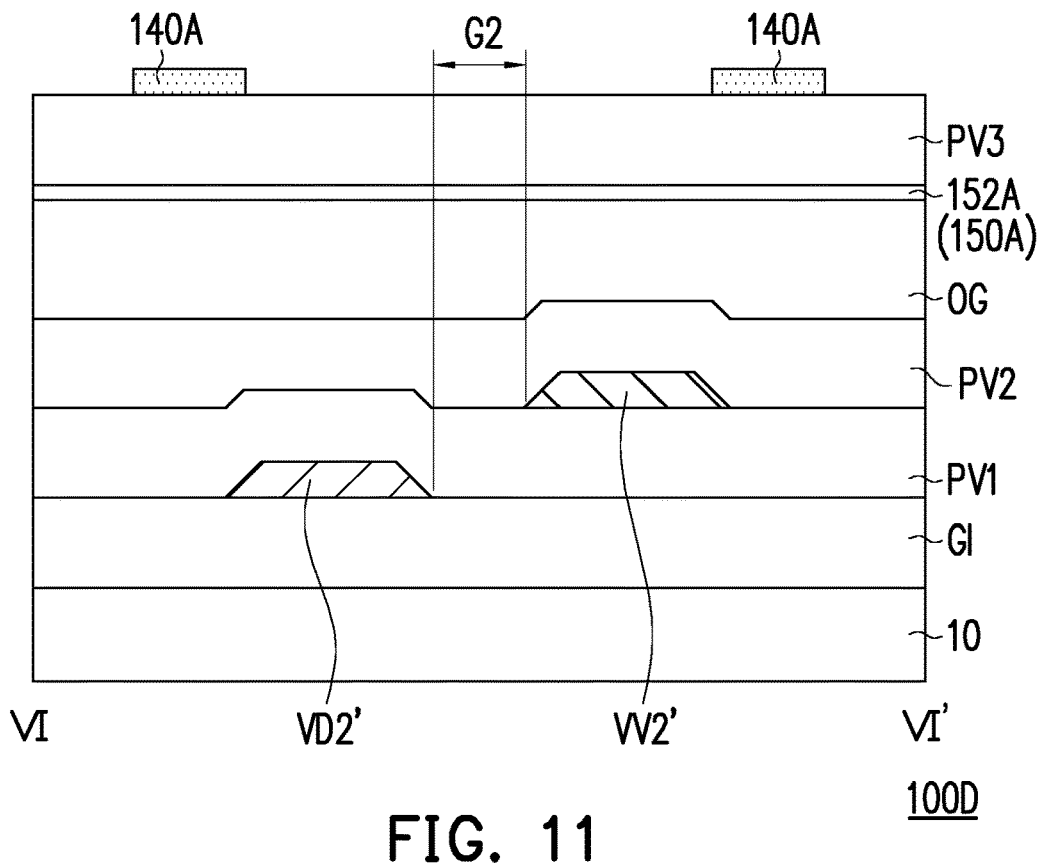
FIG. 11 is a schematic cross-sectional diagram illustrating the pixel array structure depicted in FIG. 9 along a line VI-VI'.

FIG. 9 is a schematic top-view diagram illustrating a pixel array structure according to still another embodiment of the invention. FIG. 10 and FIG. 11 are schematic cross-sectional diagrams illustrating the pixel array structure depicted in FIG. 9 along a line V-V' and a line VI-VI'. A pixel array structure 100D of the present embodiment is similar to the pixel array structure 100C of the preceding embodiment, and the elements labeled by the same symbols in the two embodiments represent the elements having similar functions and structures. The two embodiments are mainly different in that signal lines 162D and data lines 120D over a signal transmission layer 160D of the present embodiment respectively have greater folding margins than the signal lines 162C and the data lines 120C. In this way, a first vertical portion VD1' and a second vertical portion VV1' arranged in parallel are separated by a gap G1, and a first vertical portion VD2' and a second vertical portion VV2' arranged in parallel are separated by a gap G2, in which the gap G1 is the same as or slightly different from the gap G2. As such, an orthogonal projection of the data line 120D and an orthogonal projection of the signal line 162D only overlap at an intersection of the first turning portion CD and the second turning portion CV, and thereby, a loading caused to the signal transmission layer 160D by the data line 120D may be reduced more effectively.

Figure 12:
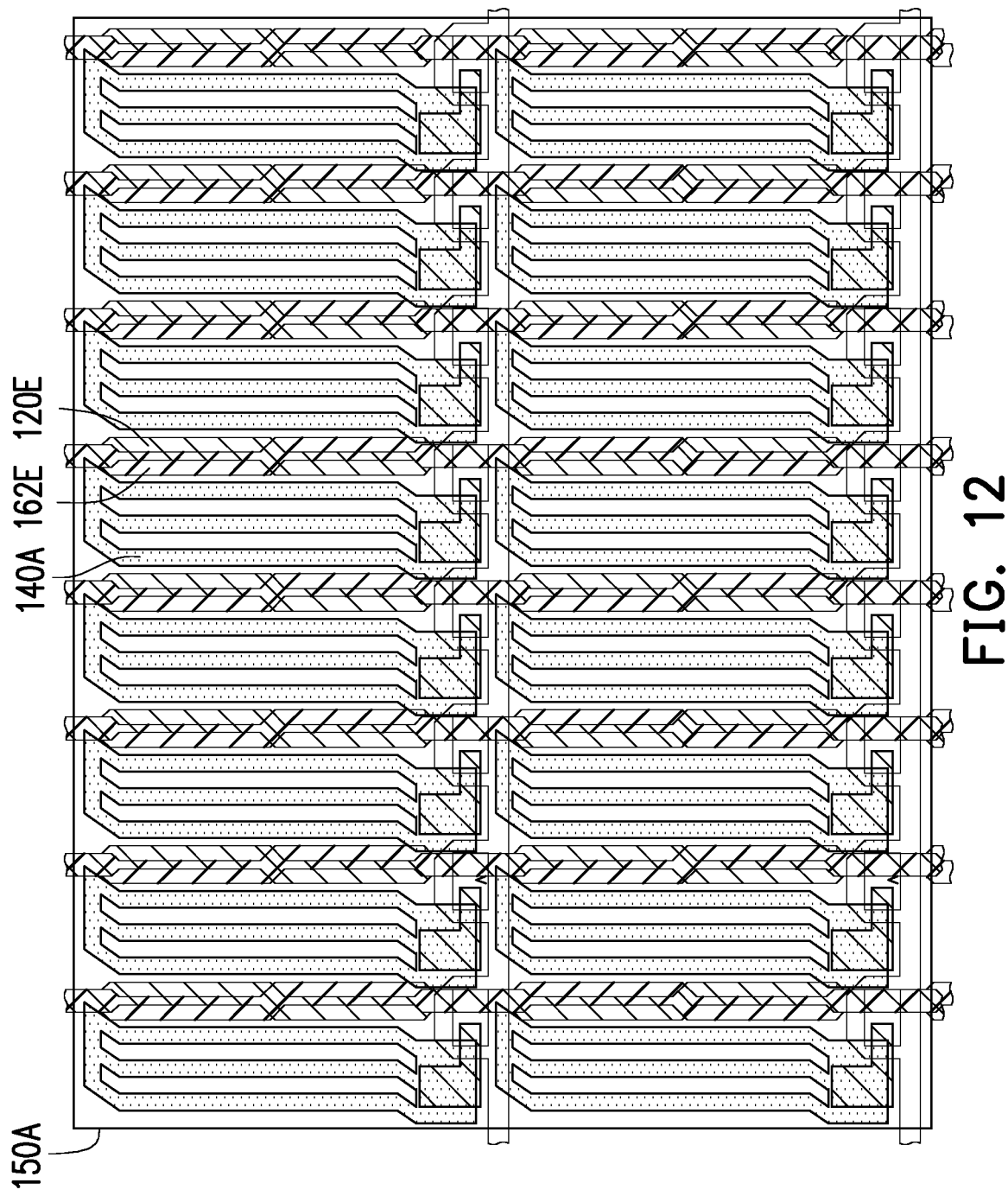
FIG. 12 is a schematic top-view diagram illustrating a pixel array structure according to yet another embodiment of the invention.

FIG. 12 is a schematic top-view diagram illustrating a pixel array structure according to yet another embodiment of the invention. Referring to FIG. 12, a pixel array structure 100E of the present embodiment is substantially the same as the pixel array structure 100C, but different in that the data lines 120E of the present embodiment have different folding directions in the pixel electrodes 140A at different columns (vertical wiring areas), and the signal lines 162E of the signal transmission layer 160E also have different folding directions in the pixel electrodes 140A at different columns. According to the text direction in FIG. 12, the odd data lines 120E are folded in a manner as right, left, left and right from top to bottom, the odd signal lines 162E are folded in a manner as left, right, right and left from top to bottom, the even data lines 120E are folded in a manner as right, left, right and left from top to bottom, and the even signal lines 162E are folded in a manner as left, right, left and right from top to bottom. In other embodiments, the folding directions of the data lines 120E and the signal lines 162E are not particularly limited, and as long as the data lines 120E and the signal lines 162E are folded in opposite directions to achieve the reduction of the ratio of the overlapping area of the data lines 120E and the signal lines 162E, the data lines 120E and the signal lines 162E may be applied to any one of the embodiments described above to reduce the loading of the touch sensing circuit and increase the touch sensing performance. This design may also contribute to mitigate a visibility issue resulted from assembly offset errors in the manufacturing process.

The embodiments illustrated in FIG. 2 through FIG. 12 as described above may be applied in the pixel array structure 100 illustrated in FIG. 1. According to FIG. 1, in order to achieve a touch sensing function, the signal lines 162 may extend from the signal transmission layer 160 toward a connection terminal (not shown) to connect with the touch sensing circuit, such that the corresponding signal electrodes 152 are connected with the touch sensing circuit through the signal lines 162. However, the connection terminal is typically disposed at a side of the pixel array structure 100, such that different distances may exist from different signal electrodes 152 to the connection terminal. In this way, the signal lines 162 of the signal transmission layer 160 have different wiring lengths. In the meantime, overlapping areas of different signal lines 162 and the corresponding data lines 120 may also be different, which lead to difference in loadings to different signal electrodes 152.

Figure 13:
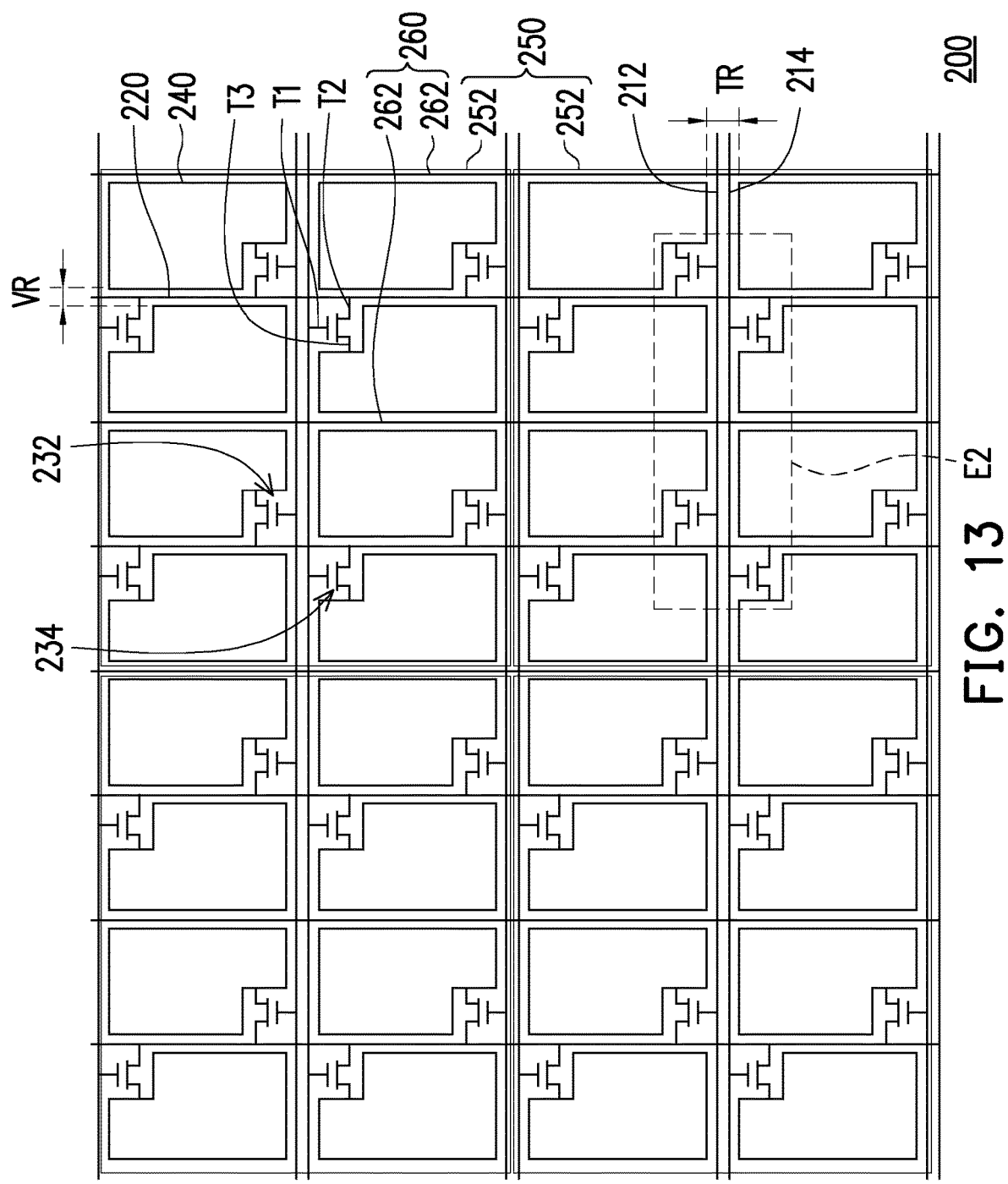
FIG. 13 is a schematic top-view diagram illustrating a pixel array structure according to another embodiment of the invention.

FIG. 13 is a schematic top-view diagram illustrating a pixel array structure according to another embodiment of the invention. Referring to FIG. 13, a pixel array structure 200 of the present embodiment includes a plurality of first scan lines 212 and second scan lines 214, a plurality of data lines 220, a plurality of first active devices 232 and second active devices 234, a plurality of pixel electrodes 240, a signal electrode layer 250 and a signal transmission layer 260. The pixel electrodes 240 are arranged in an array and have a plurality of horizontal wiring areas TR and a plurality of vertical wiring areas VR. The first scan lines 212 and the second scan lines 214 are adjacent to each other and located in one of the horizontal wiring areas TR. The data lines 220 are located in the vertical wiring areas VR and intersect the first scan lines 212 and the second scan lines 214. Each of the first active devices 232 is connected with one of the first scan lines 212 and one of the data lines 220, and each of the second active devices 234 is connected with one of the second scan lines 214 and is connected with one of the data lines 220. The signal electrode layer 250 includes a plurality of signal electrodes 252 separated from each other, and an area of one signal electrode 252 is greater than an area of one pixel electrode 240. The signal transmission layer 260 includes a plurality of signal lines 262, and each signal line 262 is electrically connected with one of the signal electrodes 252. In the present embodiment, each of the first active devices 232 or second active devices 234 may be a three-terminal device, in which a first terminal T1 is connected with one of the first scan lines 212 or second scan lines 214, a second terminal T2 is connected with one of the data lines 220, and a third terminal T3 is connected with one of the pixel electrodes 240. For instance, the first or second active devices 232 or 234 may be thin film transistors, where the first or second scan lines 212 or 214 may control turning on and turning off of the first or second active devices 232 or 234, and the data lines 220 may be configured to transmit signals for displaying an image, and the signals on the data lines 220 may be input into the corresponding pixel electrodes 240 when the first or second active devices 232 or 234 are turned on.

The present embodiment adopts a wiring design of two scan lines corresponding to a data line, and thus, a data line 220 is only disposed in one of two adjacent vertical wiring areas VR, while a signal line 262 is disposed in the other one of the two adjacent vertical wiring areas VR. Namely, the data line 220 and the signal line 262 are disposed in different vertical wiring areas VR. In the present embodiment, a configuration interval of the data lines 220 is substantially the same as a configuration interval of the signal lines 262, and the two configuration intervals of the linear structures each is substantially twice an interval of the vertical wiring areas VR. Thus, an overall area of the data lines 220 is located outside an area of each signal line 262, which contributes to reducing a loading caused to the signal transmission layer 260 by the data lines 220.

Figure 14:
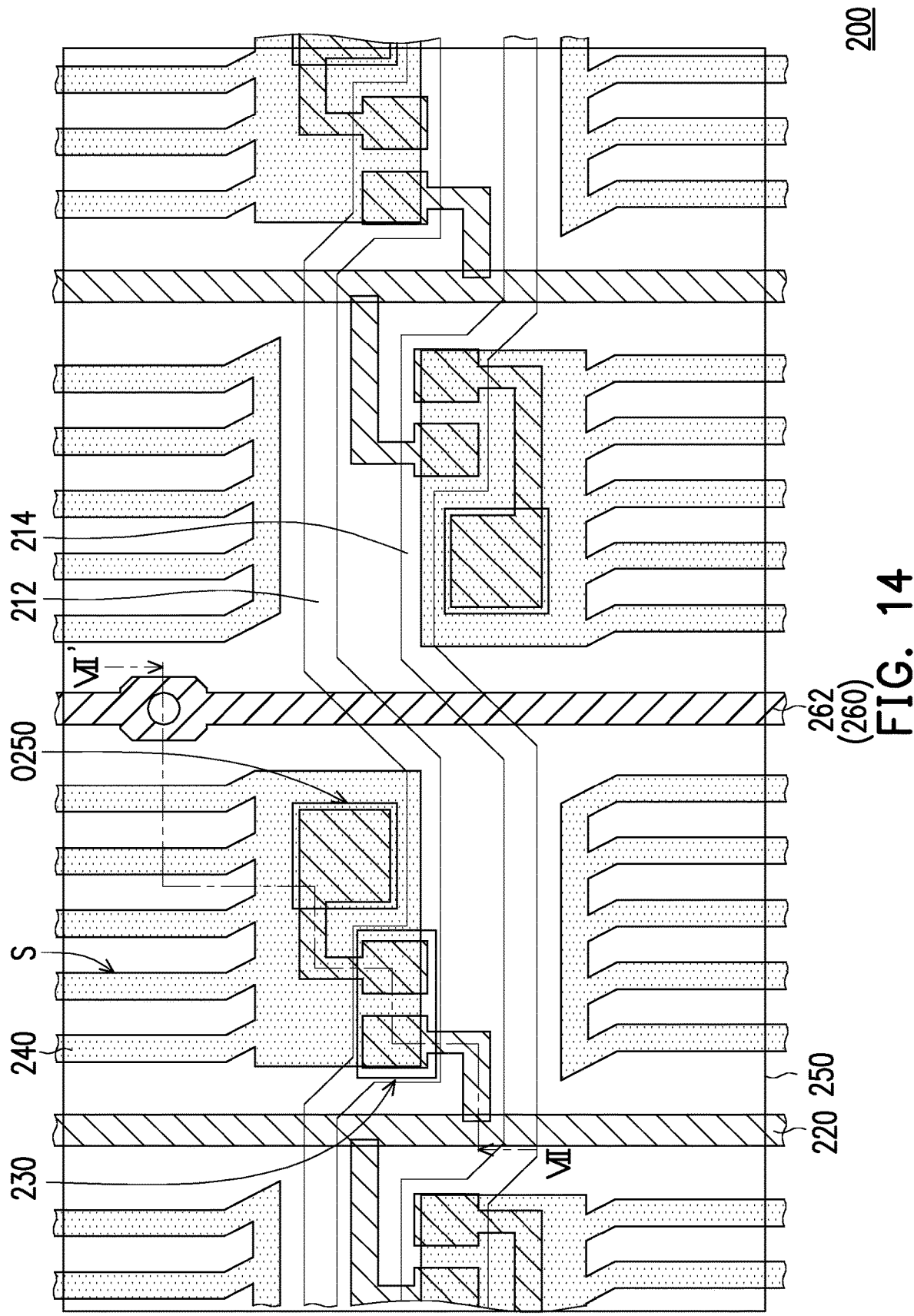
FIG. 14 is a schematic top-view diagram illustrating an implementation manner of a part E2 of the pixel array structure illustrated in FIG. 13.
Figure 15:
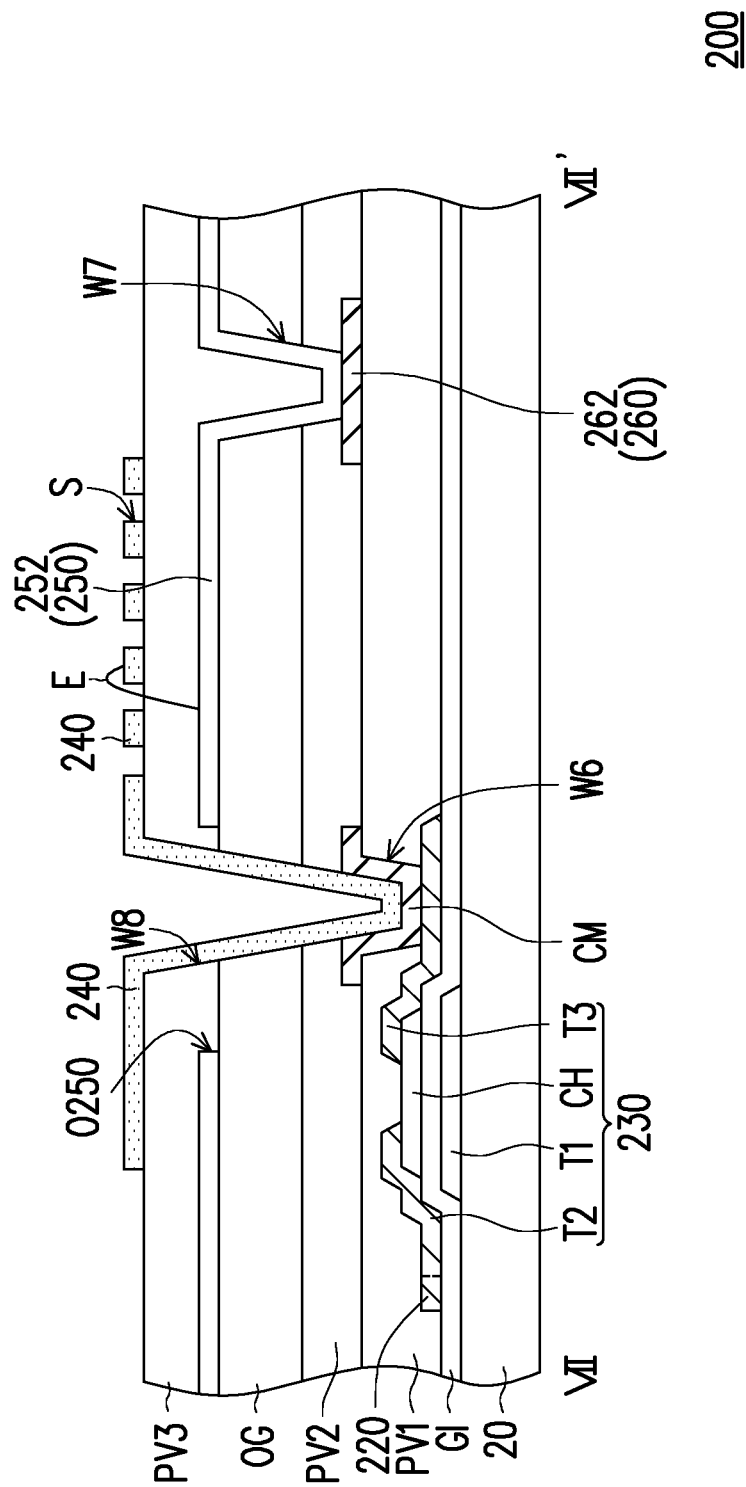
FIG. 15 a schematic top-view diagram illustrating the pixel array structure depicted in FIG. 14 along a line VII-VII'.

FIG. 14 is a schematic top-view diagram illustrating an implementation manner of a part E2 of the pixel array structure illustrated in FIG. 13. FIG. 15 a schematic top-view diagram illustrating the pixel array structure depicted in FIG. 14 along a line VII-VII'. Referring to both FIG. 14 and FIG. 15, the pixel array structure 200 is substantially formed by a plurality of film layers stacked on a substrate 20. Referring to FIG. 15, a first terminal T1 of the first active device 230 (or the second active device 234 though FIG. 15 only illustrates the first active device 230) which is connected with the first scan line 212 (or the second scan line 214) is formed by a first conductive layer disposed on the substrate 20. Therein, though the first scan line 212 is not labeled in FIG. 15, the first terminal T1 is substantially a part of the first scan line 212. An insulation layer GI covers the first terminal T1 and the first scan line 212 formed by the first conductive layer. A channel layer CH is disposed on the insulation layer GI, serves as a channel of the first active device 230 and is made of a semiconductor material. A second terminal T2, a third terminal T3 and the data line 220 are all disposed on the insulation layer GI and made of a second conductive layer, where the second terminal T2 and the third terminal T3 are disposed on the channel layer CH and physically separated from each other. The first terminal T1, the second terminal T2, the third terminal T3 and the channel layer CH jointly form the first active device 230.

An insulation layer PV1 covers the data line 220, the second terminal T2, the third terminal T3 and the channel layer CH, and the signal transmission layer 260 is disposed on the insulation layer PV1. The signal transmission layer 260 is formed by a third conductive layer. The third conductive layer selectively further includes a conductive structure CM, and the insulation layer PV1 has a contact window W6, such that the conductive structure CM is electrically connected with the third terminal T3 of the first active device 232 through the contact window W6. An insulation layer PV2 and a planarization layer OG cover the signal transmission layer 260, and the signal electrode layer 250 is disposed on the planarization layer OG. A contact window W7 penetrates the planarization layer OG and the insulation layer PV2, such that the signal electrode 252 of the signal electrode layer 250 is electrically connected with the signal line 262 through the contact window W7. An insulation layer PV3 covers the signal electrode 252 of the signal electrode layer 250. The pixel electrode 240 is disposed on the insulation layer PV3. The pixel electrode 240 is connected with the conductive structure CM through a contact window W8, so as to electrically connect with the third terminal T3 of the first active device 232 through the conductive structure CM. Therein, the contact window W8 penetrates the insulation layer PV3, the planarization layer OG and the insulation layer PV2. Additionally, the signal electrode layer 250 has an opening O250 to expose an area of the first active device 232, and the contact window W8 is located in the area of the opening O250.

Referring to FIG. 15, the signal electrode 252 is located between the pixel electrode 240 and the substrate 20, and the pixel electrode 240 has a plurality of slits S. Orthogonal projections of the slits S overlap an orthogonal projection of the signal electrode 252 on the substrate 20. When the pixel array structure 200 is applied in an apparatus, a common potential is input into the signal electrode 252, and the pixel electrode 240 receives a signal transmitted from one of the data lines 220, so as to generate a pixel driving electric field E by the fringe electrical field generated in an range of the slits S. In this way, the pixel array structure 200 may serve to drive display medium in a driving apparatus to provide a display function.

Additionally, referring to FIG. 14, an orthogonal projection of the data line 220 and an orthogonal projection of the signal line 262 of the signal transmission layer 260 are separated from each other and do not overlap, and therefore, no matter how many insulation layers exist between the film layer of the data line 220 and the film layer of the signal line 262, the coupling effect between the data line 220 and the signal line 262 is not obvious, which causes no additional loading to the signal transmission layer 260. Accordingly, the pixel array structure 200 may meet the requirements of the touch sensing circuit and has optimal touch sensing performance.

Figure 16:
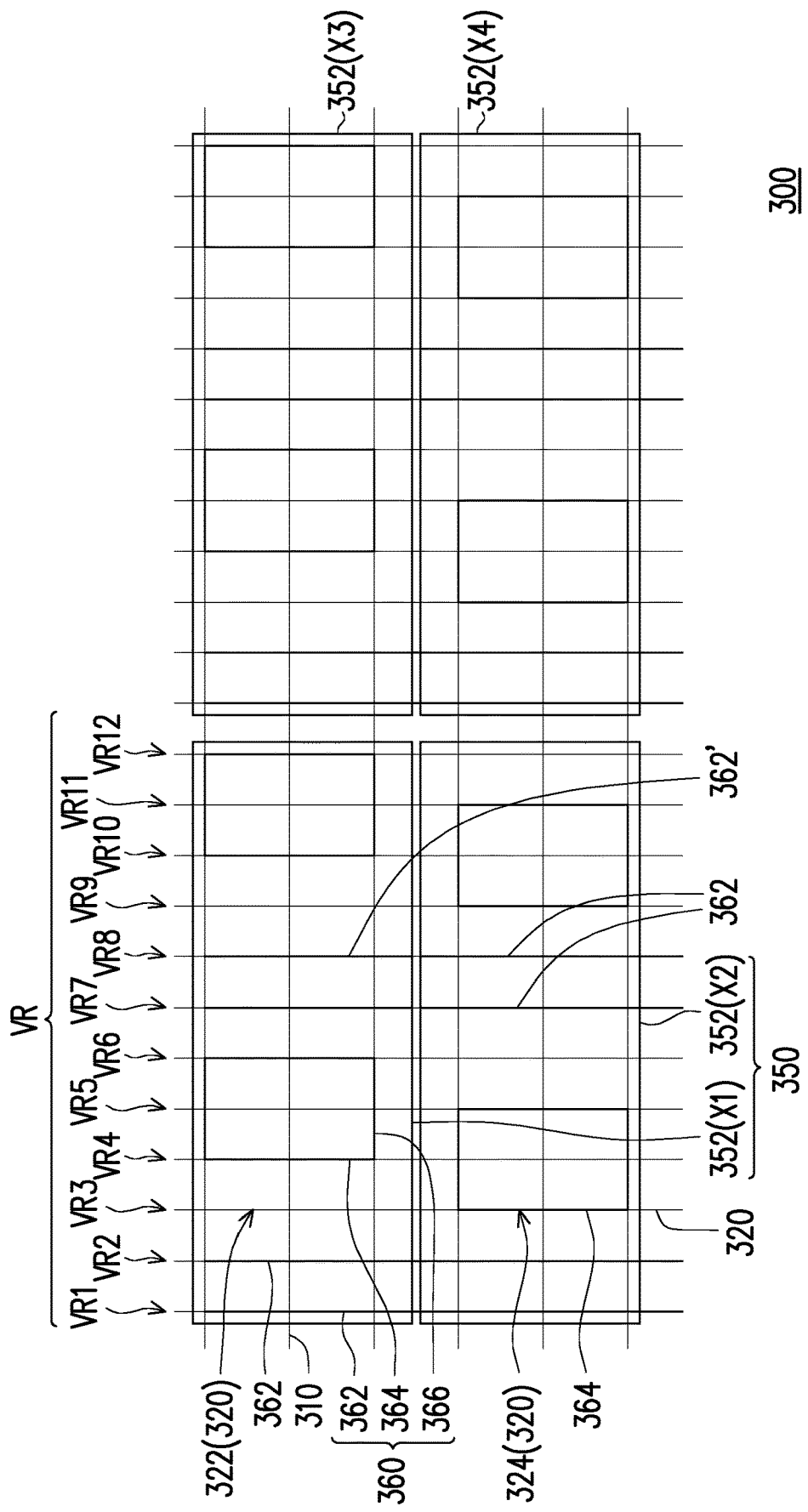
FIG. 16 a schematic diagram illustrating partial elements of the pixel array structure according to an embodiment of the invention, in which only scan lines, data lines, a signal electrode layer and a signal transmission layer of a pixel array structure are illustrated.

In the embodiments above, each signal electrode may be connected with the touch sensing circuit to achieve the touch sensing function as long as the number of the signal lines connected with the touch sensing circuit is equal to the number of the signal electrodes. Thus, the signal transmission layer may include a plurality of signal connection lines electrically connected with one of the signal electrodes, without extending outward and directly and physically connecting with the touch sensing circuit. For instance, FIG. 16 a schematic diagram illustrating partial elements of the pixel array structure according to an embodiment of the invention, in which only the scan line, the data line, the signal electrode layer and the signal transmission layer are illustrated. Referring to FIG. 16, a pixel array structure 300 includes a plurality of scan lines 310, a plurality of data lines 320, a plurality of active devices, a plurality of pixel electrodes, a signal electrode layer 350 and a signal transmission layer 360. In order to simplify to clearly illustrate part of the elements of the present embodiment, the active devices and the pixel electrodes are omitted from FIG. 16; however, functions and configuration positions of the active devices and the pixel electrodes may refer to any one of the embodiments above. Moreover, a stacking sequence of each element in the pixel array structure 300 may be configured according to the manner of any one of the embodiments above.

In the present embodiment, the data lines 320 intersect the scan lines 310. The data lines 320 are respectively located in a plurality of vertical wiring areas VR, and each of the vertical wiring areas VR may be disposed with a data line 320. However, with a distribution density design of the data lines 320, a part of the vertical wiring areas VR may not have to be disposed with the data lines 320. In this case, for descriptive convenience, a part of the vertical wiring areas VR are numbered as vertical wiring areas VR1 through VR12. The signal electrode layer 350 includes a plurality of signal electrodes 352, in which an orthogonal projection of each signal electrode 352 covers 12 data lines 320 and 3 scan lines 310. The aforementioned numerals are only examples for description, and according to designs of other embodiments, X scan lines 310 and Y data lines 320 may be disposed in the orthogonal projection of each signal electrode 352, where X and Y are respectively positive integers. In order to clearly describe a configuration of the signal electrodes 352 relative to other elements, 4 signal electrodes 352 illustrated in FIG. 16 are labeled as X1 through X4.

Figure 17:
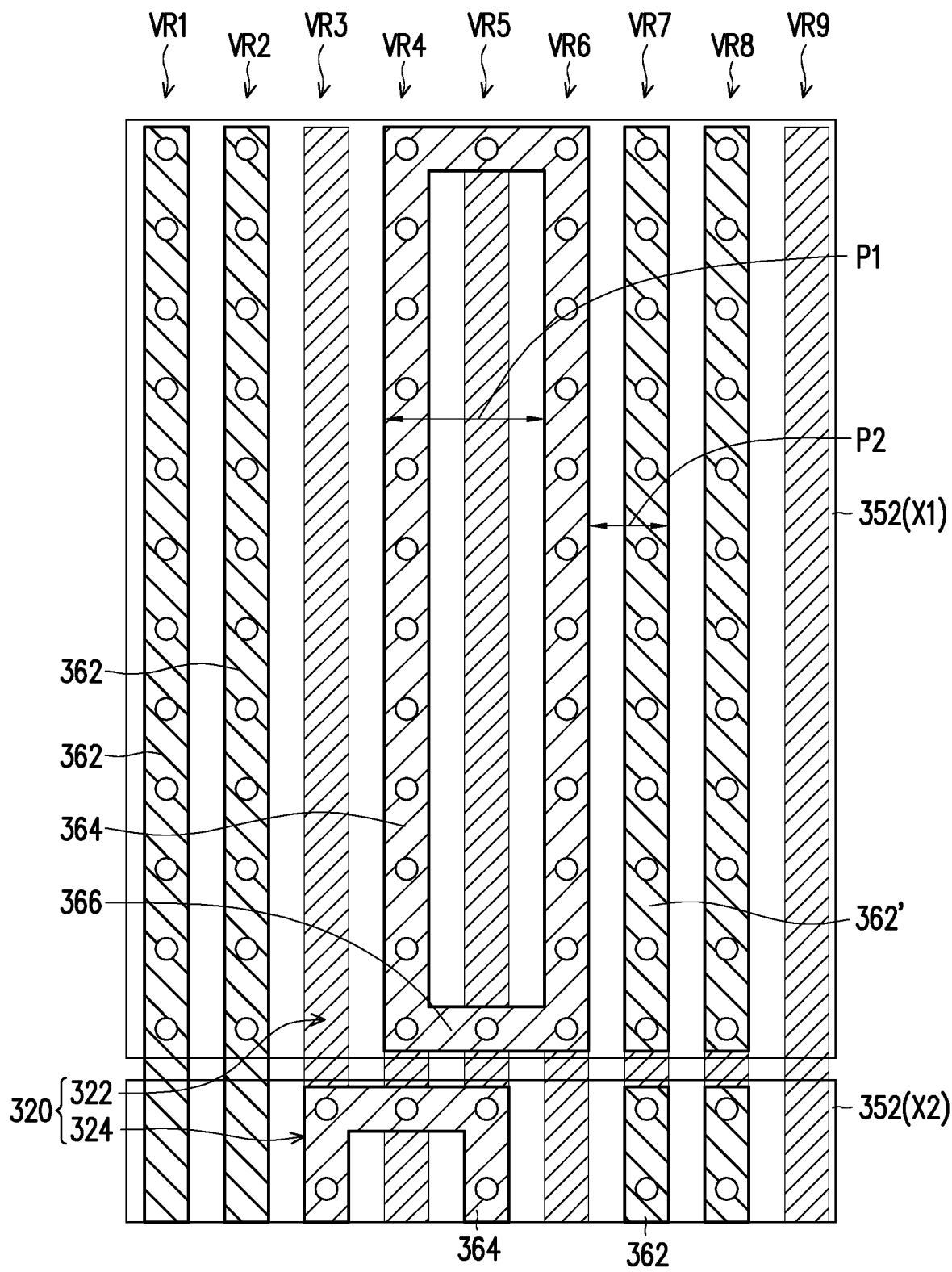
FIG. 17 is a schematic partial top-view diagram illustrating the signal electrodes labeled as X1 and X2 in the pixel array structure depicted in FIG. 16.

FIG. 17 is a schematic partial top-view diagram illustrating a part of the signal electrodes labeled as X1 and X2 in the pixel array structure depicted in FIG. 16. Referring to both FIG. 16 and FIG. 17, in the present embodiment, the signal transmission layer 360 includes a plurality of signal lines 362. Each of the signal lines 362 is configured to connect the signal electrode 352 connected therewith to the touch sensing circuit. In order to connect with the touch sensing circuit, the signal lines 362 may extend to the orthogonal projections of the signal electrodes 352 that are not electrically connected. For instance, the signal lines 362 disposed in the vertical wiring area VR1 and the vertical wiring area VR2 are electrically connected with the signal electrode 352 labeled as X1 and further extend to the orthogonal projections of the signal electrode 352 labeled as X2. In addition, the signal lines 362 disposed in the vertical wiring area VR7 and the vertical wiring area VR8 are electrically connected with the signal electrodes 352 labeled as X2 and extend outward to reach a place outside the orthogonal projection of the signal electrodes 352 labeled as X2. Meanwhile, the signal transmission layer 360 further selectively includes compensation signal lines 362'. The compensation signal lines 362' are located in the orthogonal projections of the signal electrodes 352 labeled as X1 and electrically connected with the signal electrodes 352 labeled as X1. In this way, circuit layouts of the vertical wiring areas VR7 and VR8 may present similar electrical compensation effects. However, the compensation signal lines 362' may be omitted depending on actual design requirements.

The signal transmission layer 360 further includes a plurality of signal connection lines 364. Each of the signal connection lines 364 is connected with one of the signal electrodes 352, without extending outwardly, so as to directly and physically connect with the touch sensing circuit. A length of a signal line 362 is less than or equal to a length of a corresponding data line 320, and the length of the signal line 362 may be related to a position and a size of the signal electrode 352 connected therewith. The signal connection line 364 is related to the size of the signal electrodes 352. According to FIG. 16 and FIG. 17, each signal connection line 364 is completely located in the orthogonal projection of a signal electrode 352 connected therewith. In FIG. 17, an orthogonal projection of each signal connection line 364 overlaps the data lines 320 in the same vertical wiring area VR. Thus, at least one of the data lines 320 (e.g., the data line 320 corresponding to the signal connection line 364) has at least one exposed segment 322 and at least one overlapping segment 324. An orthogonal projection of the exposed segment 322 is located outside the orthogonal projection of the corresponding signal connection line 364, and an orthogonal projection of the overlapping segment 324 overlaps the orthogonal projection of the signal connection line 364. Meanwhile, the exposed segment 322 and the overlapping segment 324 of each data line 320 are alternately arranged along an extending direction of the data line 320. As for the vertical wiring area VR3, the signal connection line 364 in the vertical wiring area VR3 is connected the signal electrode 352 labeled as X2, and the data line 320 located in the vertical wiring area VR3 has the exposed segment 322 in the signal electrodes 352 labeled as X1 and has the overlapping segment 324 in the signal electrode 352 labeled as X2.

In the present embodiment, the signal connection lines 364 are connected with the same signal electrode 352, which contribute to reduce an impedance of the signal electrode 352. However, according to the cross-sectional view and related description of the preceding embodiment, the film layer of the signal connection line 364 is located between the film layers of the signal electrodes 352 and the data lines 320, and the coupling effect between the signal connection line 364 and the corresponding data line 320 may increase the loading of the signal electrodes 352. Thus, in term of the present embodiment, an interval P1 of the signal connection lines 364 connected with the same signal electrode 352 is greater than an interval P2 of the data lines 320. Additionally, the interval P1 may be twice the interval P2, such that the exposed segment 322 of one data line 320 may be between two adjacent signal connection lines 364. Thus, in the area of the same signal electrode 352, a part of the data lines 320 overlaps the signal connection lines 364 and another part thereof does not overlap any signal lines 362 or signal connection lines 364 which lead to reducing the loading on the signal transmission layer 360. In addition, the interval of the signal connection lines 364 may be a constant, regularly varied or randomly varied value.

Furthermore, in an embodiment, ends of the signal connection lines 364 of the signal transmission layer 360 may be free ends, and multiple signal connection lines 364 may be physically independent from one another to present multiple independent stripe patterns. However, in the present embodiment, the signal transmission layer 360 may also selectively include at least one connection line 366. An extending direction of the connection line 366 is perpendicular or intersecting to an extending direction of each signal connection line 364, and the connection line 366 connects M signal connection lines 364 of the same signal electrode 352, where M is a positive integer greater than or equal to 2. In this way, at least two or more signal connection lines 364 are physically connected together through the connection line 366 to form a grid pattern. In the present embodiment, M is 2, for example, but M may be other values according to actual design requirements. In this way, the connection line 366 and the signal connection lines 364 connected therewith may achieve smaller resistance and more uniform potentials of the signal electrodes 352. In addition, the number of the connection lines 366 may be N, where N is a positive integer greater than or equal to 2, and an interval of the connection line 366 may be a constant, regularly varied or randomly varied value.

Referring to FIG. 16, in addition to the above layout design, the number of the signal connection lines 364 achieve within the area of each signal electrode 352 is identical in the present embodiment. In this way, for each of the signal electrodes 352, values of coupling capacitances (or referred to as parasitic capacitances) caused by the data lines 320 are approximate to one another, which contributes to signal computation as well as touch sensing performance of the touch sensing circuit. Moreover, in some embodiments, the coupling capacitances of all the signal electrodes 352 in a panel may have approximate values by regulating the number of the signal lines 364 in each signal electrode.

Figure 18:
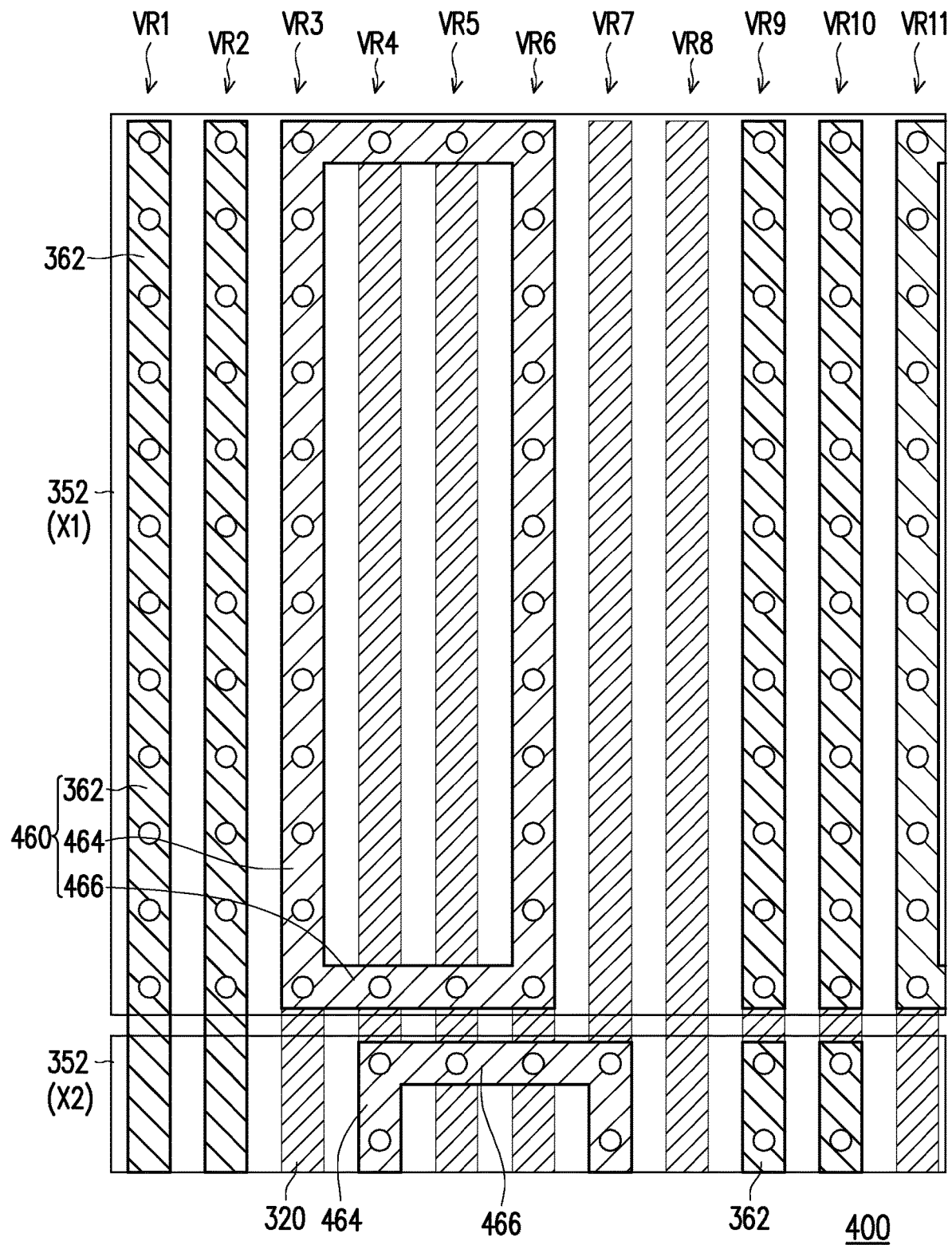
FIG. 18 is a schematic diagram illustrating data lines, signal electrodes and a signal transmission layer in a part of a pixel array structure according to another embodiment of the invention.

FIG. 18 is a schematic diagram illustrating data lines, signal electrodes and a signal transmission layer in a part of a pixel array structure according to another embodiment of the invention. Referring to FIG. 18, only data lines 320, signal electrode layers 350 and a signal transmission layer 460 of prat of a pixel array structure 400 are illustrated; however, the pixel array structure 400 actually also includes the scan lines, the active devices and the pixel electrodes of any one of the embodiments above. In the present embodiment, the structure designs and the configuration positions of the data lines 320 and the signal electrode layer 350 may refer to the descriptions related to the embodiment illustrated in FIG. 16 and FIG. 17 and thus, will not be repeatedly described. To be specific, the pixel array structure 400 of the present embodiment is different from the pixel array structure 300 mainly in the signal transmission layer 460 of the present embodiment including a plurality of signal lines 362, a plurality of signal connection lines 464 and a plurality of connection lines 466. The signal lines 362 may refer to the embodiment illustrated in FIG. 16 and FIG. 17. Additionally, in the present embodiment, an interval P3 between two adjacent signal connection lines 464 connected with the same signal electrode 352 may be triple the interval P2 of the data lines 320. Thus, there are two data lines 320 between the two adjacent signal connection lines 464. Moreover, the signal connection lines 464 connected with two vertically adjacent signal electrodes 352 are located on different data lines 320, so as to form alternately arranged configuration relationship.

Furthermore, in some embodiments, the interval P1 may be A times the interval P2, where A may be an integral multiple greater than 2. Additionally, in some embodiments, the interval P1 may be a positive integer greater than the interval P2.

Taking the vertical wiring areas VR1 through VR8 illustrated in FIG. 18 for example, the signal connection lines 464 in an area of the signal electrodes 352 labeled as X1 are signal connection lines 464 in the vertical wiring areas VR3 and VR6, and the signal connection lines 464 in an area of the signal electrodes 352 labeled as X2 are disposed in the vertical wiring areas VR4 and VR7. Meanwhile, the signal electrodes 352 labeled as X1 and the signal electrodes 352 labeled as X2 are adjacent to each other in a vertical direction. In addition, if there is another signal electrode 352 under the signal electrodes 352 labeled as X2, the signal connection lines 464 corresponding to aforementioned another signal electrode 352 may be selectively disposed in the vertical wiring areas VR5 and VR8.

Figure 19:
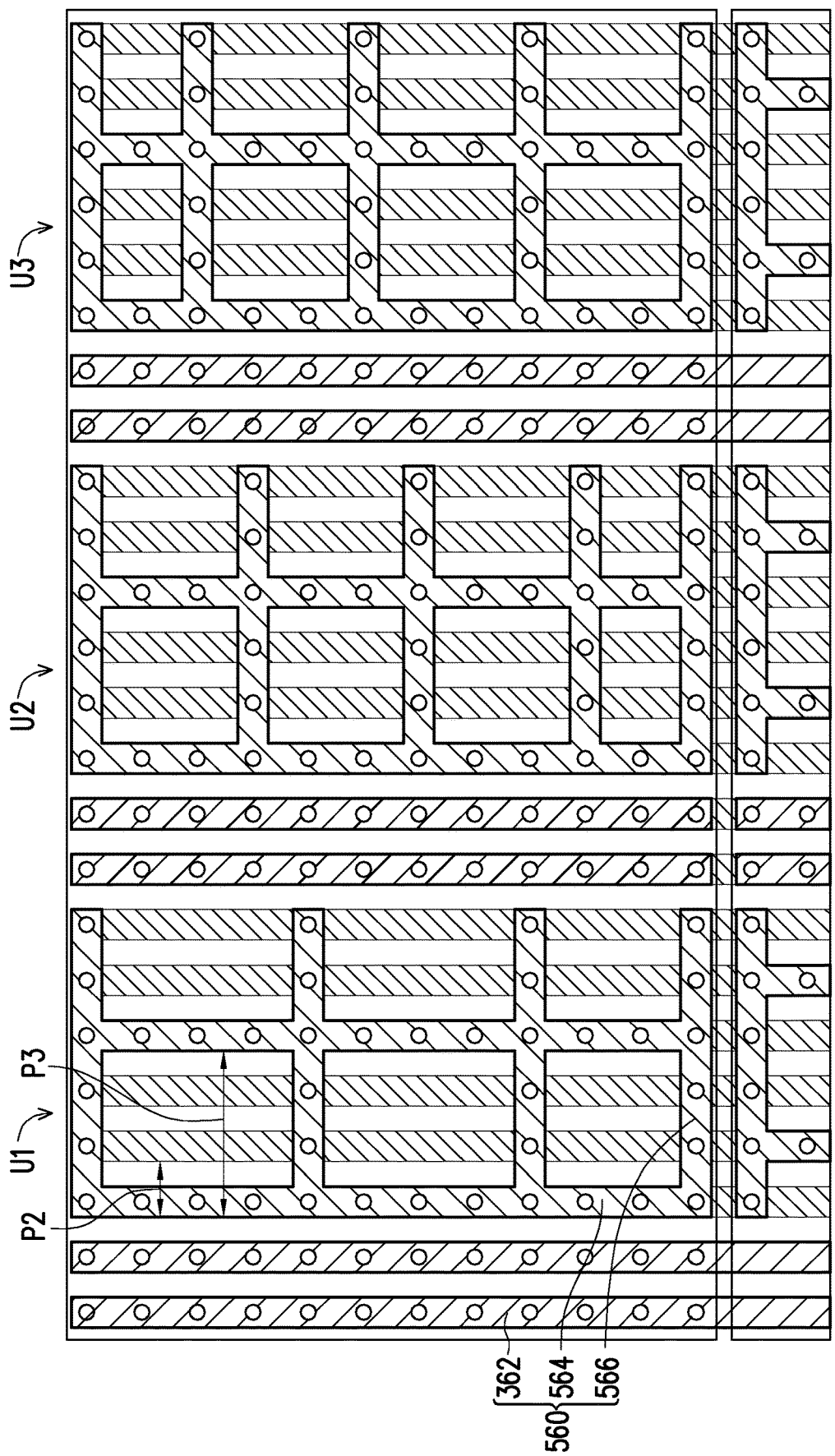
FIG. 19 is a schematic diagram illustrating data lines and a signal transmission layer in part of a pixel array structure according to another embodiment of the invention.

In the embodiments illustrated in FIG. 16 through FIG. 18, the connection lines 366 and 466 are all disposed at end portions of the corresponding signal connection lines 364 or 464 and connected between two signal connection line 364s or between two signal connection lines 464, but the invention is not limited thereto. For example, FIG. 19 is a schematic diagram illustrating data lines and a signal transmission layer in part of a pixel array structure according to another embodiment of the invention. Referring to FIG. 19, only data lines 320 and a signal transmission layer 560 in a part of a pixel array structure 500 are illustrated; however, the pixel array structure 400 actually also includes the scan lines, the active devices, the pixel electrodes and the signal electrode layer of any one of the embodiments above. In the present embodiment, the structure designs and the configuration positions of the data line 320 may refer to the descriptions related to the embodiment illustrated in FIG. 16 and FIG. 17 and thus, will not be repeatedly described. To be specific, the pixel array structure 500 of the present embodiment is different from the pixel array structure 300 mainly in the signal transmission layer 560 of the present embodiment including a plurality of signal lines 362, a plurality of signal connection lines 564 and a plurality of connection line 566. The signal lines 362 may refer to the embodiment illustrated in FIG. 16 and FIG. 17. Additionally, in the present embodiment, the interval P3 between two adjacent signal connection lines 564 may be triple the interval P2 of the data lines 320. The two signal connection lines 564 may be connected with a plurality of connection lines 566, and a length of each connection line 566 is greater than the interval P3, such that at least one end of the connection line 566 is not connected with the signal connection line 564. In this way, a plurality of contact windows may be disposed along a length direction of the connection lines 566, such that the corresponding signal electrodes are electrically connected with the connection lines 566 through the contact windows. Thereby, with the conductivity of the connection lines 566, impedances of the corresponding signal electrodes may be reduced, and potential uniformity of the corresponding signal electrodes may be enhanced.

Furthermore, referring to FIG. 19, the connection lines 566 and the signal connection lines 564 form a plurality of transmission units U1, U2 and U3 which are physically independent from one another, and positions of the connection lines 566 disposed in the transmission units U1, U2 and U3 are inconsistent. Namely, the disposition positions of the connection lines 566 are particularly limited in the present embodiment. Nevertheless, in the pixel array structure 500, the connection lines 566 may be selectively disposed in positions on an area of the scan lines or positions where opaque elements are originally disposed.

Figure 20:
FIG. 20 is a schematic diagram illustrating a display panel according to an embodiment of the invention.

FIG. 20 is a schematic diagram illustrating a display panel according to an embodiment of the invention. Referring to FIG. 20, a display panel 1 includes a first substrate SUB1, a second substrate SUB2, a display medium DM and a pixel array structure PX. The first substrate SUB1 and the second substrate SUB2 are vertically opposite to each other. The display medium DM is located between the first substrate SUB1 and the second substrate SUB2, and the pixel array structure PX is located between the first substrate SUB1 and the display medium DM. In the present embodiment, the pixel array structure PX may be one of the pixel array structures 100, 100A through 100E and 200 through 500 in the embodiments above. One of the signal electrodes and the pixel electrodes having the slits are more adjacent to the display medium DM than the other in the pixel array structure PX. In the present embodiment, the display medium DM may be liquid crystal or other display materials capable of being driven by a pixel driving electric field provided by the pixel array structure PX, such as an electrophoretic display material, an electrowetting display material and so on. According to the embodiments above, the pixel array structure PX itself is capable of not only providing the pixel driving electric field but also performing touch sensing, and thus, the display panel 1 has a built-in touch structure. A color filter layer may be selectively disposed on the second substrate SUB2, such that the display panel 1 is capable of providing a full color display effect. Additionally, an electrode layer for providing the pixel driving electric field is not necessary to be disposed on the second substrate SUB2. Nevertheless, in other embodiments, the electrode layer for providing the pixel driving electric field may be selectively disposed on the second substrate SUB2 to achieve different driving modes.

Figure 21:
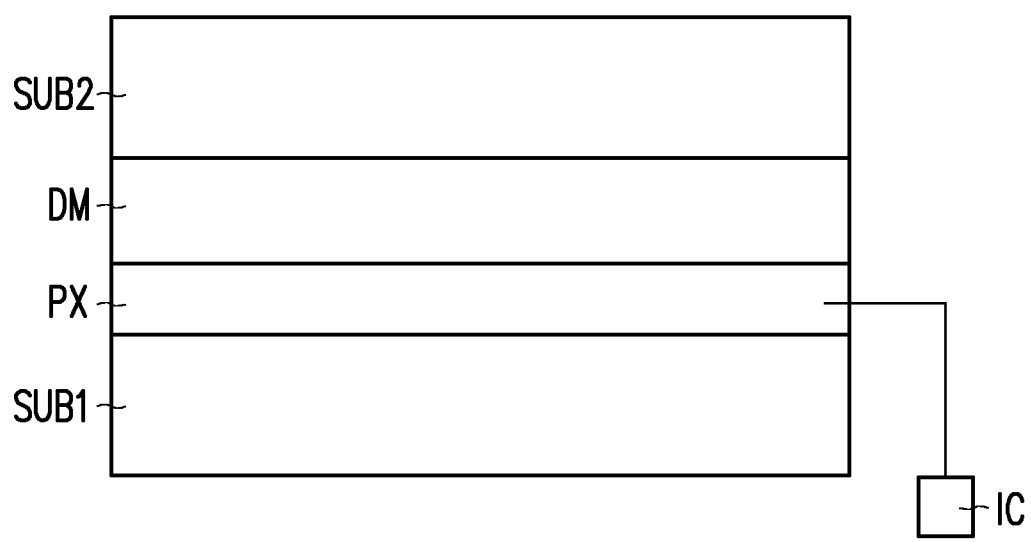
FIG. 21 is a schematic diagram illustrating a touch display device according to an embodiment of the invention.

FIG. 21 is a schematic diagram illustrating a touch display device according to an embodiment of the invention. Referring to FIG. 21, a touch display device 2 includes a display panel 1 and a touch sensing circuit IC. The display panel 1 may refer to the description related to the embodiment illustrated in FIG. 20. The touch sensing circuit IC is connected with a signal transmission layer in the pixel array structure PX. In this way, the touch sensing circuit IC may sense capacitance change sensed by each signal electrode in the pixel array structure PX. According to the embodiments above, the signal transmission layer in the pixel array structure PX is employed to connect each signal electrodes with the touch sensing circuit IC, and the signal transmission layer may mitigate the coupling phenomena with the data lines by utilizing the structure designs of the embodiments above. Thereby, the touch display device 2 may achieve optimal touch sensing performance.

To summarize, in the pixel array structure of the embodiments of the invention, the signal electrode layer includes a plurality of signal electrodes which physically independent. The signal electrodes can be employed to provide not only the pixel driving electric field but also the touch sensing function to achieve the design of built-in touch sensing structure. In addition, the pixel array structure of the embodiments of the invention is disposed with the signal transmission layer which is employed to connect each signal electrode with the touch sensing circuit and transmit the common potential required for displaying. By adjusting a contour of the signal transmission layer, at least a part of the orthogonal projection of the signal transmission layer is not overlapping the orthogonal projections of the data lines. Thus, the loading caused to the signal transmission layer by the coupling effect of the data lines can be mitigated, such that the signal to noise ratio of the touch sensing can be reduced. In this way, the touch sensing structure built in the pixel array structure can have good sensing quality. Moreover, the display panel and the touch display device of the invention having the pixel array structure can achieve an optimal touch function.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A touch display device, comprising:
 a first substrate;
 a display medium, located on the first substrate; and
 a pixel array structure, located between the first substrate and the display medium, wherein the pixel array structure comprises:
  a scan line;
  an another scan line, parallel to the scan line;
  a data line, intersecting the scan line and the another scan line, and the data line comprising a first portion, a first turning portion and an another first portion, wherein the first turning portion is connected between the first portion and the another first portion;
  an active device, connected with the scan line and the data line;
  an another active device, connected with the another scan line and the data line;
  a pixel electrode electrically connected with the active device, wherein at least a portion of the pixel electrode is adjacent to and between the scan line and the another scan line; and
  a signal line comprising a second portion, a second turning portion and an another second portion, wherein the second turning portion is connected between the second portion and the another second portion, wherein the first portion and the second portion are disposed between the active device and the another active device.

2. The touch display device according to claim 1, wherein at least a part of the signal line is located outside the data line.

3. The touch display device according to claim 1, wherein an overlapping area of the data line and the signal line is less than or equal to 50% of an overall area of the data line.

4. The touch display device according to claim 1, wherein the first turning portion intersects the second turning portion, and the another first portion is located on an extension line of the second portion.

5. The touch display device according to claim 4, wherein a width of the second turning portion is different from a width of the second portion in a line-width direction.

6. The touch display device according to claim 5, wherein the width of the second turning portion is greater than the width of the second portion in the line-width direction.

7. The touch display device according to claim 1, wherein an extension direction of the second turning portion is different from an extension direction of the second portion and an extension direction of the another second portion.

8. The touch display device according to claim 7, wherein a width of the second turning portion is different from a width of the second portion in a line-width direction.

9. The touch display device according to claim 8, wherein the width of the second turning portion is greater than the width of the second portion in the line-width direction.

10. The touch display device according to claim 1, wherein the display medium is liquid crystal.

11. A touch display device, comprising:
a first substrate;
a display medium, located on the first substrate; and
a pixel array structure, located between the first substrate and the display medium, wherein the pixel array structure comprises:
a data line;
a pixel electrode, electrically connected to the data line;
a signal electrode, wherein at least a part of the signal electrode overlaps the pixel electrode; and
a signal transmission layer, comprising a signal line and a compensation signal line, wherein a line length of the compensation signal line is less than a line length of the data line,
wherein the signal electrode is electrically connected with the signal line through a contact window.

12. The touch display device according to claim 11, wherein the compensation signal line is located in an orthogonal projection of the signal electrode.

13. The touch display device according to claim 11 wherein a projection of the contact window on the first substrate is overlapping with the signal electrode and the signal line.

14. The touch display device according to claim 11, wherein a common potential is input into the signal electrode.

15. The touch display device according to claim 11, further comprising:
a touch sensing circuit, connected with the signal electrode.

16. The touch display device according to claim 11, further comprising:
an insulation layer, disposed between the data line and the signal transmission layer.

17. The touch display device according to claim 11, wherein the display medium is liquid crystal.

* * * * *